United States Patent
Linnell et al.

(10) Patent No.: US 9,157,795 B1
(45) Date of Patent: Oct. 13, 2015

(54) SYSTEMS AND METHODS FOR CALIBRATING LIGHT SOURCES

(71) Applicant: Bot & Dolly, LLC, San Francisco, CA (US)

(72) Inventors: Jeffrey Linnell, San Francisco, CA (US); Marek Michalowski, San Francisco, CA (US); Jean-Francois Dupuis, San Francisco, CA (US); Thiago Hersan, San Francisco, CA (US)

(73) Assignee: Bot & Dolly, LLC, San Francisco, CA (US)

( * ) Notice: Subject to any disclaimer, the term of this patent is extended or adjusted under 35 U.S.C. 154(b) by 18 days.

(21) Appl. No.: 14/094,674

(22) Filed: Dec. 2, 2013

Related U.S. Application Data

(60) Provisional application No. 61/847,075, filed on Jul. 16, 2013.

(51) Int. Cl.
*G01J 1/00* (2006.01)
*G01J 1/42* (2006.01)
*G01S 5/00* (2006.01)
*G01B 21/00* (2006.01)

(52) U.S. Cl.
CPC .............. *G01J 1/4257* (2013.01); *G01B 21/00* (2013.01); *G01S 5/00* (2013.01)

(58) Field of Classification Search
CPC ............ G01S 5/00; G01S 17/00; G01B 21/00
USPC ......................... 356/614, 610, 623
See application file for complete search history.

(56) References Cited

U.S. PATENT DOCUMENTS

| | | | |
|---|---|---|---|
| 4,652,205 A | 3/1987 | Ross et al. | |
| 5,083,073 A | 1/1992 | Kato | |
| 5,510,993 A | 1/1992 | Kato | |
| 5,920,394 A * | 7/1999 | Gelbart et al. | 356/615 |
| 2006/0222314 A1* | 10/2006 | Zumbrunn et al. | 385/147 |
| 2007/0265728 A1* | 11/2007 | Marsh et al. | 700/195 |
| 2008/0316306 A1 | 12/2008 | Burkle et al. | |
| 2011/0317879 A1* | 12/2011 | Demopoulos | 382/106 |
| 2012/0120415 A1* | 5/2012 | Steffensen et al. | 356/614 |
| 2012/0188350 A1 | 7/2012 | Hammond et al. | |
| 2012/0236320 A1* | 9/2012 | Steffey et al. | 356/614 |

\* cited by examiner

*Primary Examiner* — Tarifur Chowdhury
*Assistant Examiner* — Isiaka Akanbi
(74) *Attorney, Agent, or Firm* — McDonnell Boehnen Hulbert & Berghoff LLP

(57) ABSTRACT

Example methods and systems for calibrating one or more light sources are described. One example method includes determining a position of at least three photosensors relative to a world frame, controlling an orientation of at least one light source so as to cause the at least one light source to project a light beam across an area encompassing the at least three photosensors, receiving signals indicating a sensing of a light beam directed at one of the photosensors, determining orientations of the at least one light source that cause a signal at one of the photosensors, and based on the position of the at least three photosensors and the orientations of the at least one light source that cause a signal at one of the photosensors, determining a transformation from a local frame of the at least one light source to the world frame.

25 Claims, 22 Drawing Sheets

SYSTEMS AND METHODS FOR CALIBRATING LIGHT SOURCES

CROSS REFERENCE TO RELATED APPLICATION

The present application claims priority to U.S. Provisional patent application Ser. No. 61/847,075, filed on Jul. 16, 2013, and entitled "Systems and Methods for Integrating Lighting Effects with Robots," which is herein incorporated by reference as if fully set forth in this description.

BACKGROUND

Unless otherwise indicated herein, the materials described in this section are not prior art to the claims in this application and are not admitted to be prior art by inclusion in this section.

Projected beams of light are sometimes used in the entertainment industry to create laser light shows. For instance, a light show may consist of projected light beams to accompany a musical performance or some other type of entertainment. Laser projectors or other lighting fixtures may be used to project different types of light beams, such as light beams with different colors or frequencies. A computing device may be used to control the projectors through a standard protocol for stage lighting and effects, such as DMX, in order to control aspects of a light show, including directions, sizes, colors, and patterns of projected light beams.

SUMMARY

Example methods and systems for calibrating one or more light sources are described. First, a group of at least three photosensors may be placed in an environment of the light sources, and the position of the photosensors relative to the environment may be determined. Then, during a homing sequence, orientations of the light sources may be controlled to project a light beam over an area encompassing the photosensors. When a light beam from one of the light sources is directed at one of the photosensors, the photosensor may send a signal indicating a sensing of a light beam, and an orientation of the light source that caused the signal may be determined. Then, the positions of the photosensors and the orientations of the light sources that caused a signal at one of the photosensors may be used to determine a transformation from local frames of the light sources to a world frame in the environment.

In one example, a method is provided that includes determining a position of at least three photosensors relative to a world frame, controlling an orientation of at least one light source so as to cause the at least one light source to project a light beam across an area encompassing the at least three photosensors, receiving, from the at least three photosensors, signals indicating a sensing of a light beam directed at one of the photosensors, determining orientations of the at least one light source that cause a signal at one of the photosensors, and based on the position of the at least three photosensors and the orientations of the at least one light source that cause a signal at one of the photosensors, determining a transformation from a local frame of the at least one light source to the world frame.

In another example, a system is provided that includes at least three photosensors, at least one light source, and a control system configured to determine a position of the at least three photosensors relative to a world frame, control an orientation of the at least one light source so as to cause the at least one light source to project a light beam across an area encompassing the at least three photosensors, receive, from the at least three photosensors, signals indicating a sensing of a light beam directed at one of the photosensors, determine orientations of the at least one light source that cause a signal at one of the photosensors, and based on the position of the at least three photosensors and the orientations of the at least one light source that cause a signal at one of the photosensors, determine a transformation from a local frame of the at least one light source to the world frame.

In still another example, a non-transitory computer readable medium having stored therein instructions that when executed by a computing system, cause the computing system to perform functions is disclosed, the functions including determining a position of at least three photosensors relative to a world frame, controlling an orientation of at least one light source so as to cause the at least one light source to project a light beam across an area encompassing the at least three photosensors, receiving, from the at least three photosensors, signals indicating a sensing of a light beam directed at one of the photosensors, determining orientations of the at least one light source that cause a signal at one of the photosensors, and based on the position of the at least three photosensors and the orientations of the at least one light source that cause a signal at one of the photosensors, determining a transformation from a local frame of the at least one light source to the world frame.

In yet another example, a system may include means for determining a position of at least three photosensors relative to a world frame, means for controlling an orientation of at least one light source so as to cause the at least one light source to project a light beam across an area encompassing the at least three photosensors, means for receiving, from the at least three photosensors, signals indicating a sensing of a light beam directed at one of the photosensors, means for determining orientations of the at least one light source that cause a signal at one of the photosensors, and based on the position of the at least three photosensors and the orientations of the at least one light source that cause a signal at one of the photosensors, means for determining a transformation from a local frame of the at least one light source to the world frame.

These as well as other aspects, advantages, and alternatives, will become apparent to those of ordinary skill in the art by reading the following detailed description, with reference where appropriate to the accompanying figures.

DETAILED DESCRIPTION

I. Overview

Figure 1:
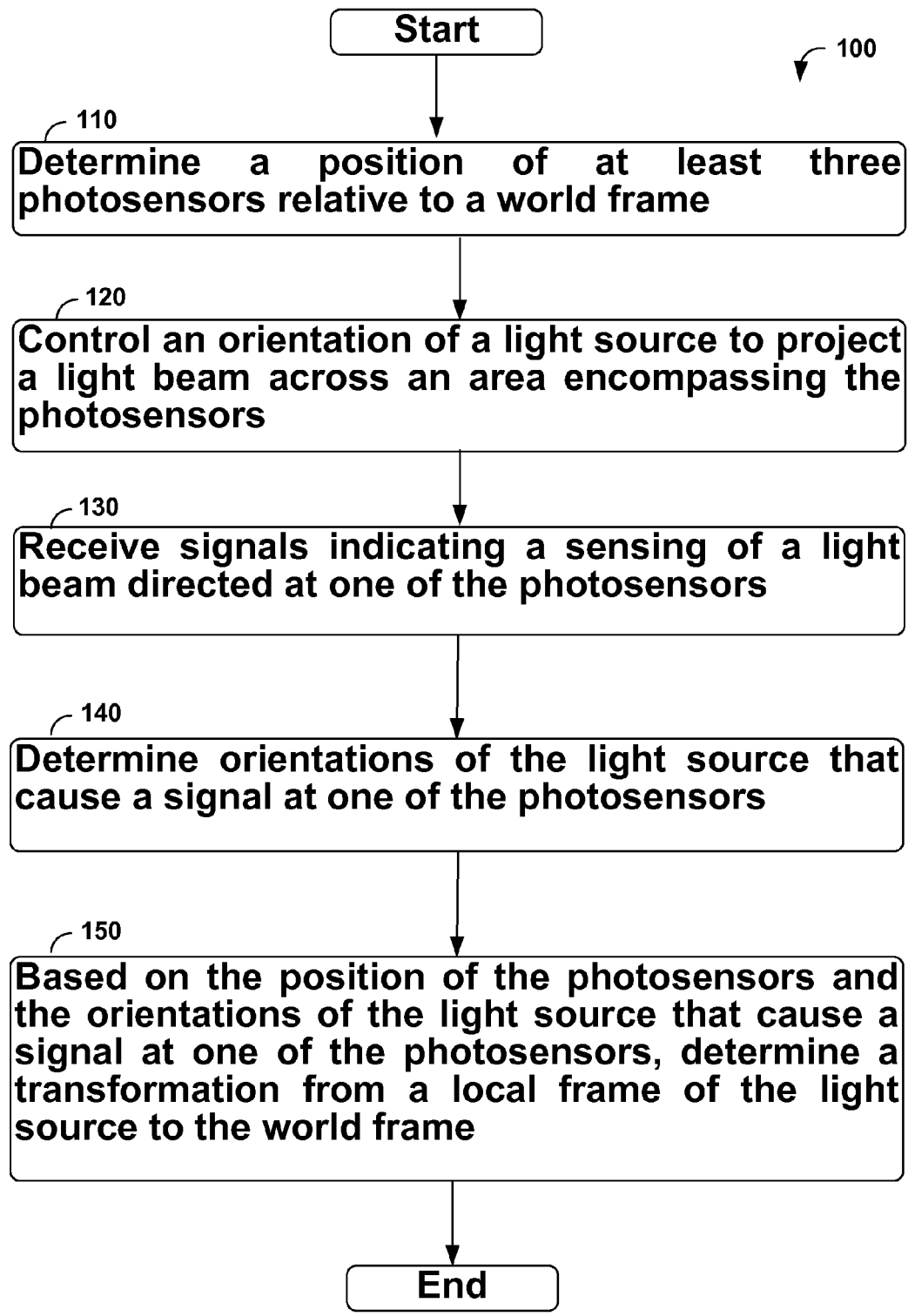
FIG. 1 is a block diagram of a method, according to an example embodiment.

Examples of methods and systems are described herein. It should be understood that the words "example" and "exemplary" are used herein to mean "serving as an example, instance, or illustration." Any embodiment or feature described herein as "exemplary" is not necessarily to be construed as preferred or advantageous over other embodiments or features. The example or exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Light sources capable of projecting light beams on a stage can be used for a number of applications, such as to create a light show as part of a performance. In some examples, it may be useful to know with a certain degree of precision how the light sources are positioned and/or oriented relative to a known world location. This information may be useful in order to control where light beams will be projected relative to other aspects of a stage, such as screens, mirrors, or actors. For instance, by determining where a light source is on the stage and/or how it is oriented relative to the stage, a light beam may be targeted at a mirror on the stage in order to create a reflected light beam in a particular direction.

The process of determining how light sources and/or other actors are positioned and/or oriented in an environment may be referred to as "calibration." Since mounting locations and other parameters may change each time light sources and/or other actors are set up in a different environment, such as when a touring show is set up in different venues each night, it may be useful to perform calibration quickly each time a stage is set up and/or whenever certain aspects of the stage have been moved.

Example systems and methods allow for calibration of a stage containing one or more light sources and/or one or more other components (e.g., "actors"). In particular, a transformation from a local frame of each light source to a known frame of the world may be determined. For instance, the transformation may indicate how to change the position and/or orientation of a light source in order to reach the known world frame. In some examples, multiple light sources may all be calibrated relative to a single world frame in an environment, either in sequence or simultaneously.

In some examples, three or more photosensors (or "photodetectors") may be positioned within an environment containing one or more light sources to be calibrated. A photosensor may be capable of detecting when a light beam is projected at the photosensor, such as from one of the light sources. In certain examples, the photosensors may be capable of determining particular aspects of detected light beams as well, such as the RGB color of a light beam or the frequency of a light beam.

Positions of the photosensors relative to the world may then be determined using one of a number of different methods. For instance, the photosensors may all be mounted on a pre-measured rigid frame and the location of the frame may be determined in order to figure out where all the photosensors are located. In other examples, the photosensors may be positioned within the environment, such as on the floor of the stage. Then, a separate, high-precision laser tracker may be used to determine precise locations of the photosensors. In additional examples, the photosensors may be equipped with location sensors that may detect the locations of the photosensors and transmit the location information to a control system, such as through a wireless data connection.

A homing sequence may then be initiated, during which a control system may cause the one or more light sources to project light beams across an area that encompasses the photosensors. For instance, the control system may cause the light sources to sweep across different sections of the stage by adjusting the pan and/or tilt of the light sources. The homing sequence may be continued for each light source until the light source has projected a light beam hitting at least three of the photosensors in the environment.

As the one or more light sources are projecting light beams across the environment, the control system may receive a signal from one of the photosensors when the photosensor detects a light beam. The control system may additionally determine orientations of the light source(s) that cause a detected signal at one of the photosensors. For instance, the control system may determine commanded axis values (e.g., pan and tilt) that cause a particular light source to project a light beam that hits one of the photosensors.

The determined positions of the photosensors in the environment and the orientations of the one or more light sources that cause a signal at one of photosensors may then be used to determine transformations from a local frame of each light source to a world frame. For instance, a translation and rotation may be determined indicating how each of the light sources is mounted relative to the stage. This information may be determined by solving a geometry problem (referred to as three-dimensional resection), where a known position of three or more points and directions to the three or more points from an unknown point may be used to determine a position and orientation of a light source located at the unknown point.

In further examples, more than three photosensors may be used for additional precision, such as by determining a position and orientation of the light source that minimizes the error in the determined directions towards each of the photosensors. Additionally, other systems may be used to verify determined results and/or achieve additional precision. For instance, a high-precision laser tracker may be used to determine the position of a sensor located on the light source to verify that the determined position and orientation of the light source within the stage is accurate.

In additional examples, the orientation of a light source causing a signal at one of the photosensors may be further refined using a centering sequence. For instance, the light source may project a light beam that is much bigger in size than the photosensor. Additional precision may therefore be obtained by determining an orientation that causes the light source to project a light beam with the photosensor located at a center point of the beam. To determine this point, the light beam may first be moved in one direction until the photosensor no longer senses the light beam. Then, the light beam may be moved in the opposite direction until the photosensor again no longer senses the light beam. The average of these two orientations may then be used to determine how to center the light beam over the photosensor in one direction. The process may be repeated in a perpendicular direction to find an orientation of the light source that projects a light beam with the photosensor located at a center point of the beam.

Once a light source has been calibrated relative to a stage, it may be controlled to project lights in coordination with other aspects of a stage, such as during a laser light show. In some examples, the determined position and orientation of the light source may also be used, possibly in combination with other data, to determine inaccuracies in commanded positions of the light source (i.e., differences between a commanded position from a control system and an actual real-world position of the light source). Accordingly, example calibration methods may account for inaccuracies in the light source to provide precise calibration with the stage.

In further examples, multiple light sources within an environment may be calibrated. For instance, the photosensors may be used to calibrate dozens or hundreds of light sources on a stage during a single calibration sequence. In one example, the light sources may be calibrated one at a time so that a light source causing a signal at a particular photosensor can be identified. In other examples, some or all of the light sources may be calibrated simultaneously by causing the light sources to project light beams with identifying features (e.g., color, frequency, beam pattern, or strobing pattern). The photosensors may then be used to identify which light source caused a signal (e.g., by sensing the color of a detected light bream). In additional examples involving large stages, the photosensors may be connected together in a mesh network or other type of network in order to communicate calibration data to a control system.

Example methods therefore may allow for calibration of one or more light sources in an environment, such as a stage of a performance venue. The calibrated stage may then be used to coordinate projected light beams from the light sources with other aspects of stage, such as during a laser light show or other type of performance.

II. Example Systems and Methods for Calibrating a Light Source

FIG. 1 is a block diagram of a method, according to an example embodiment. The method 100 may be carried out by a computing device, such as a control system located on a stage. The control system may communicate with photosensors, light sources, and/or other components on the stage, such as to command axis values of the light sources and/or receive sensor data from the photosensors. In some examples, the control system may maintain information about the environment (e.g., ambient light levels) in order to make the system robust to changes in the environment. In further examples, all or some of method 100 may be carried out by one or more computing systems located on the individual light sources and/or photosensors. In some examples, the parts of the method 100 may be combined, separated into additional parts, and/or carried out in a different order than shown. Other configurations are also possible.

More specifically, the method 100 may initially involve determining a position of at least three photo sensors relative to a world frame, as shown by block 110. The photosensors (or "photodetectors") may be any of a number of different types of sensors capable of detecting light and/or other electromagnetic energy. For example, the photosensors may include light-emitting diodes (LEDs), photodiodes, active pixel sensors, charge-coupled devices, light dependent resistors (LDRs), infrared sensors, optical detectors, and/or other types of sensors. In some examples, the photosensors may be capable of determining identifying properties of detected light beams as well, such as color or frequency. In further examples, the photosensors may be battery-powered or contain a different power source.

The positions of the photosensors may include (X, Y, Z) values relative to a world frame. Herein, the world frame should be understood to be a coordinate axis positioned somewhere on stage (e.g., with an origin at a corner of the stage or some other known point in the environment). In some examples, the positions of the photosensors may include a Z-component indicating a vertical offset built into the photosensor itself and/or a height of an aspect of the environment that the photosensor may be mounted on, such as an elevated part of a stage, steps, device actors, or other mechanical components, for example. In other examples, all of the photosensors may be mounted directly on the floor, such that only X- and Y-components may be used to indicate positions of the photosensors.

Figure 2A:
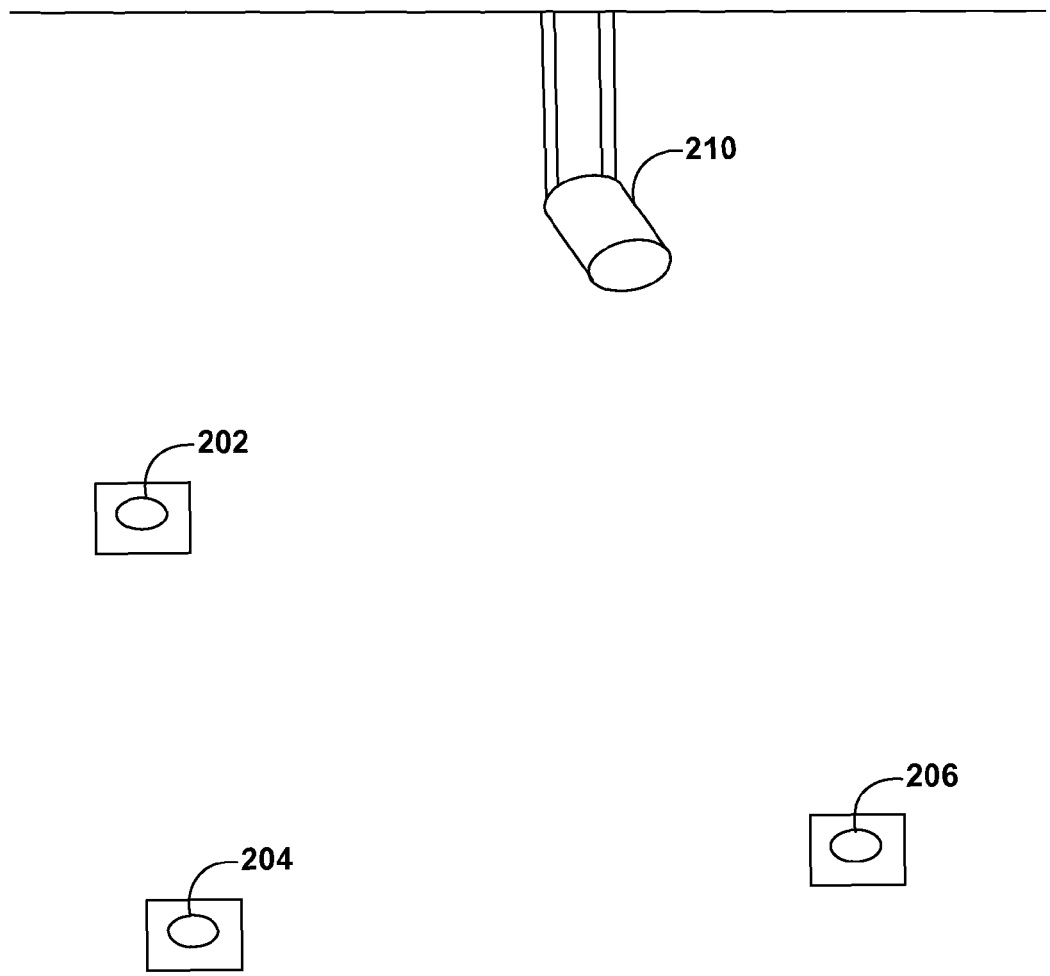
FIG. 2A illustrates a stage containing three photosensors and a light source, according to an example embodiment.

FIG. 2A shows a stage containing three photosensors and a light source, according to an example embodiment. As shown, three photosensors 202, 204, and 206 may be positioned at different places within a stage. In some examples, the photosensors may be spaced out around the stage with a certain amount of space between any two photosensors. In further examples, the photosensors may all be placed at the same elevation or they may be placed at different elevations. Additionally, the photosensors may be positioned such that any light source to be calibrated has an orientation that allows the light source to project a light beam that hits at least three of the photosensors. A single light source 210 is shown in the Figure as an overhead light mounted on the ceiling of the stage, but additional light sources and/or light sources mounted at other locations besides the ceiling could be used as well.

Figure 2B:
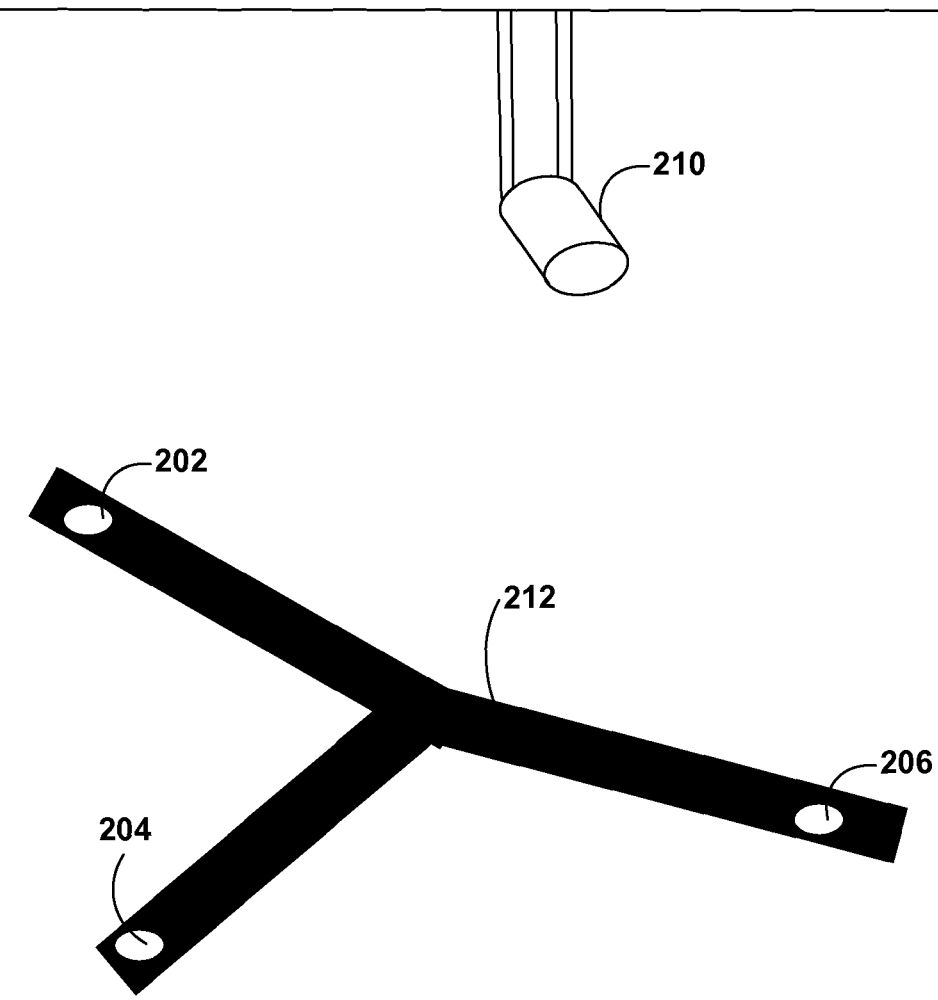
FIG. 2B illustrates a stage containing three photosensors mounted on a rigid frame and a light source, according to an example embodiment.

The positions of the photosensors within an environment may be determined in a number of different ways. In one example, FIG. 2B shows photosensors mounted on a pre-measured rigid frame. As shown, each of three photosensors 202, 204, and 206 may be mounted at different positions on a rigid frame 212. The dimensions of the frame may be predetermined so that the position of a given photosensor at a particular mounting point relative to the rigid frame can be easily determined. The rigid frame 212 may then be positioned on a stage so that its position relative to a world reference frame on the stage may be easily determined (e.g., a corner of the rigid frame may be placed at a corner of the stage). In alternative examples, the world reference frame may be positioned relative to the location of the rigid frame on the stage (e.g., at a junction point of the rigid frame). In either case, the positions of the photosensors 202, 204, and 206 relative to the world frame may then be determined based on where they are mounted on the rigid frame 212. In some examples, many photosensors (e.g., hundreds or thousands) could be positioned on a single rigid frame or multiple rigid frames.

Figure 2C:
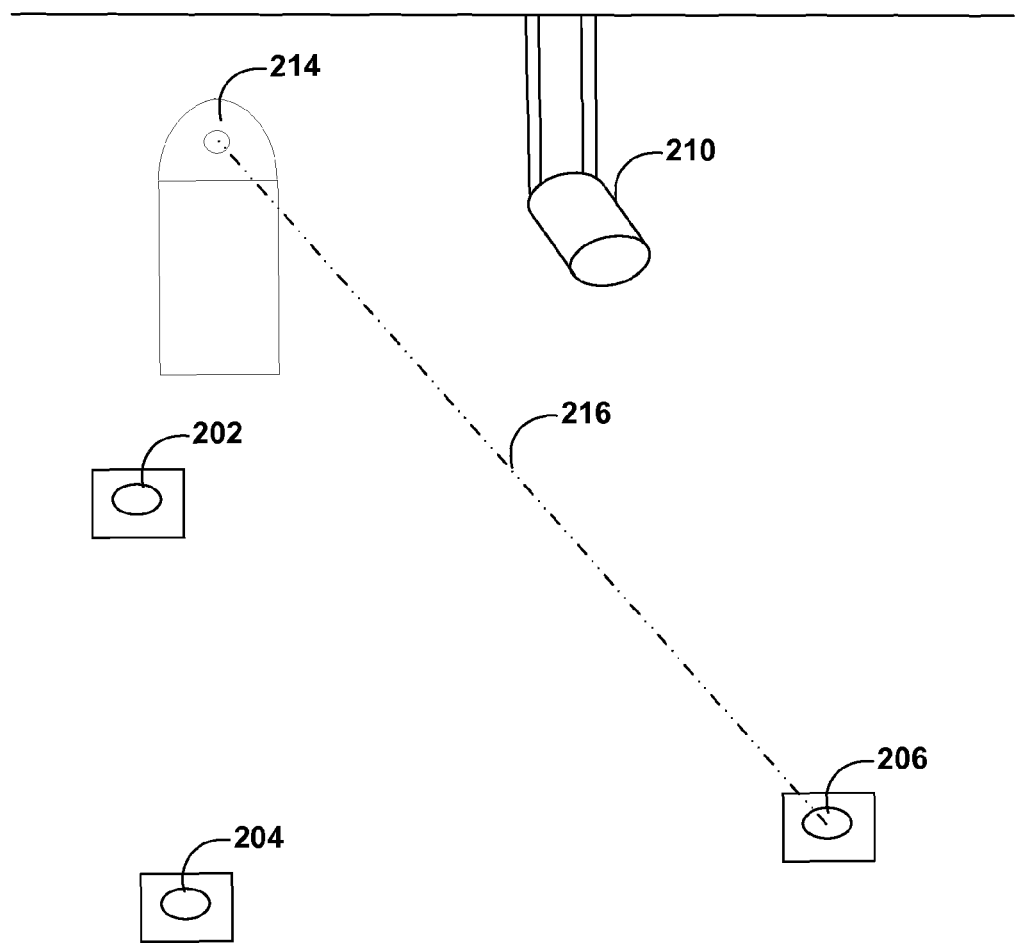
FIG. 2C illustrates a stage containing three photosensors, a light source, and a laser tracker, according to an example embodiment.

In another example, FIG. 2C shows photosensors on a stage along with a laser tracker. As shown, a laser tracker 214 may project a laser beam 216 at one of the photosensors 206. The laser beam 216 may be reflected back to the laser tracker 214 by either the photosensor 206 or an optical target mounted on the photosensor 206. In order to determine the position of the photosensor 206, the laser tracker 214 may then determine precise positions of one or more points on the photosensor 206 based on when the laser beam 216 is reflected back to the laser tracker 214. The laser tracker 214 may be positioned on the stage at one or more points so that it has an unobstructed view of each of the photosensors 202, 204, and 206 in order to measure the positions of all of the photosensors on the stage.

Figure 2D:
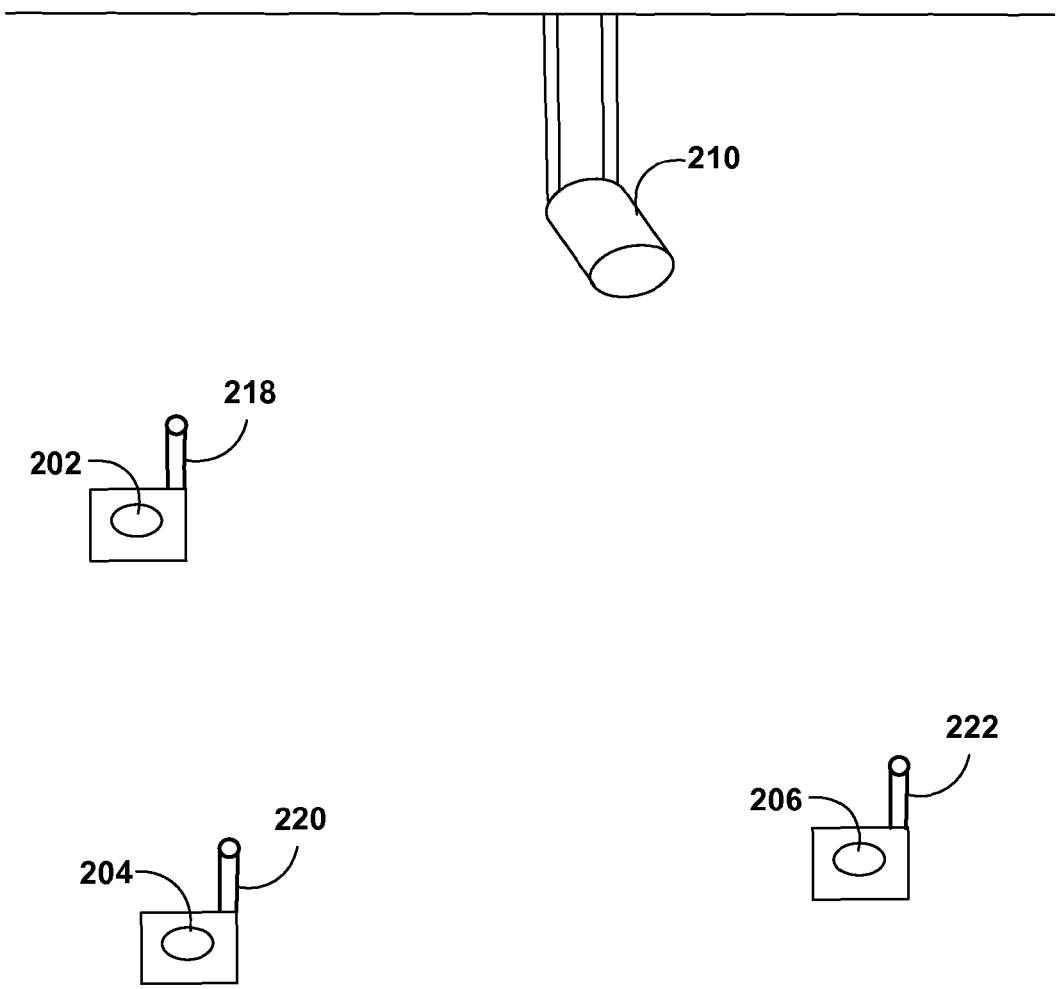
FIG. 2D illustrates a stage containing three photosensors with position sensors and a light source, according to an example embodiment.

In a further example, FIG. 2D shows photosensors on a stage that each contain a position sensor. As shown, each of the photosensors 202, 204, and 206 may be equipped with its own position sensor 218, 220, and 222. A position sensor could be any device capable of enabling position measurement, such as a position transducer, a GPS sensor, a proximity sensor, or a displacement sensor. The position sensors could be either absolute position sensors or relative position sensors, and could be linear or angular sensors across one or more axes. Additionally, each of the position sensors 218, 220, and 222 may be capable of communicating position information to a remote computing system, such as through a wireless connection. The computing system may then use the position information to determine positions of the photosensors for use in calibrating lights on the stage. In some examples, local computing systems on the photosensors 202, 204, and 206 may perform processing steps on the position data locally as well or instead.

In some examples, different methods for determining the position of the photosensors within an environment may be combined for additional precision and/or other types of methods not explicitly listed here could be used as well or instead.

The method 100 may then involve controlling an orientation of a light source to project a light beam across an area encompassing the photosensors, as shown by block 120. The light source may be any of a number of different types of movable light sources with at least one degree of freedom. In some examples, one or more light sources could be head light fixtures, such as head light fixtures with two degrees of freedom. Such lighting fixtures may be mounted on one or more motors that allow the fixtures to pan (horizontal swing) and tilt (vertical swing), independently or at the same time. In other examples, one or more light sources could be moving mirror type fixtures where the fixture itself does not move but a mirror moves instead in order to direct light beams. In additional examples, one or more of the light sources could be laser projectors capable of projecting laser light beams. In further examples, the light source(s) may be capable of projecting light beams with varying colors, beam widths, patterns, shapes, and/or frequencies. Additionally, the light source(s) could be mounted on the ceiling, on the walls, on a stand positioned on the floor, or elsewhere within the stage.

In some examples, light source(s) may be controlled by a computing device using the Digital Multiplex (DMX) protocol, the Remote Device Management (RDM) protocol, or some other serial protocol to transmit control signals to the light source(s). The light source(s) may then translate control signals into internal signals that may be used to control internal motors. In other examples, the computing device may interface directly with motors controlling the lights(s) via a motor controller or another digital-to-analog converter. Additionally, computing devices may be connected to the light source(s) and/or other components on the stage via a wireless network or a different local-area network. In further examples, Ethernet cabling may be used to transfer data to and/or from the light source(s) as well or instead. Control may also come from other computing systems and/or may be distributed across multiple computing systems as well.

Figure 3A:
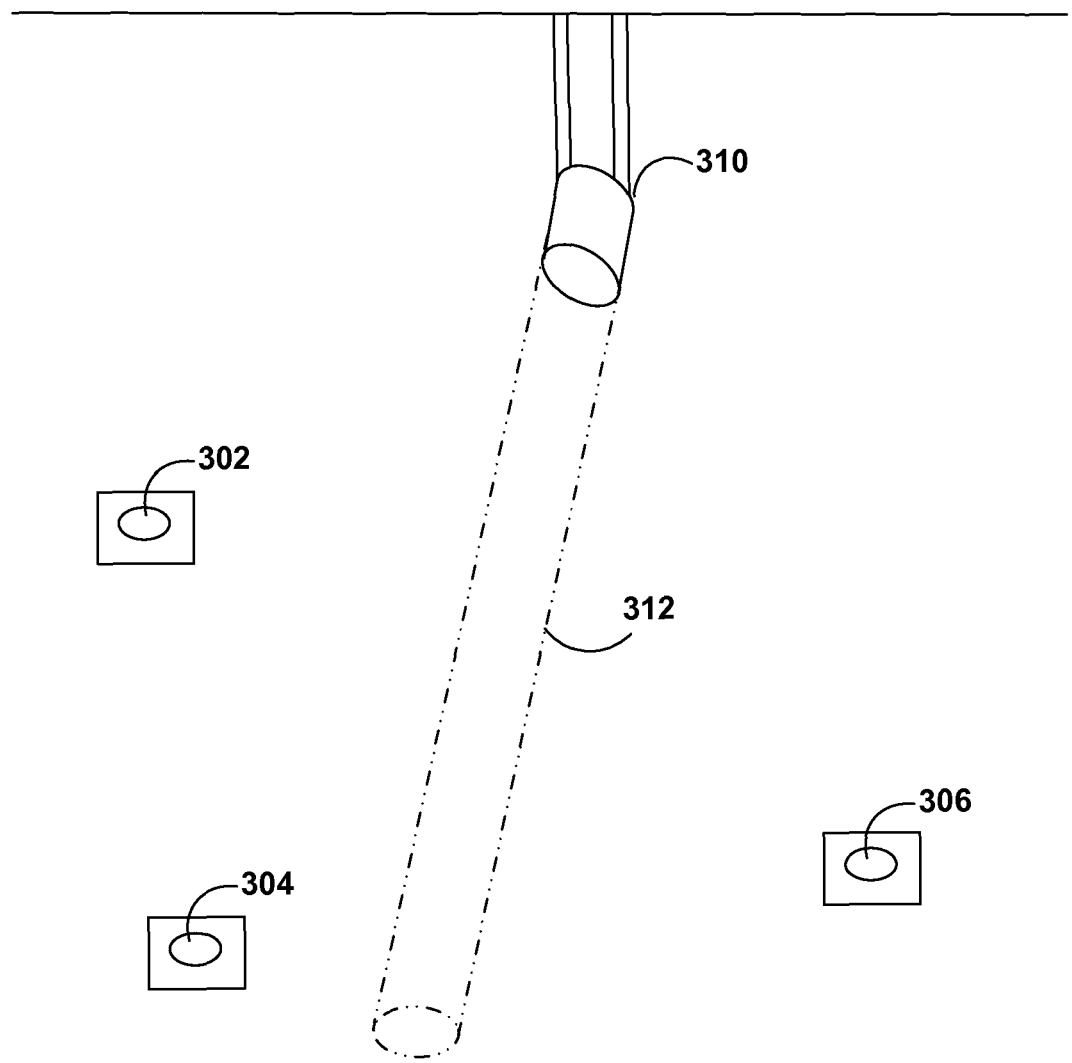
FIG. 3A illustrates a stage containing three photosensors and a light source projecting a light beam, according to an example embodiment.

FIG. 3A shows a configuration of a light source and photosensors, according to an example embodiment. More specifically, in the illustrated configuration, the light source 310 is projecting a light beam 312 across a stage containing three photosensors, 302 to 306. The light source 310 may project a light beam 312 onto a floor or other part of a stage. While the light source 310 continues to project the light beam 312, a control system may then cause the light source 310 to project the light beam 312 onto other areas within the stage, for example, by changing the pan and/or tilt of the light source 310. The control system may cause the light source 310 to project the light beam 312 around the stage in any number of different ways. For instance, the pan and/or tilt of the light source 310 may be adjusted in a systematic way to cover sections of the stage (e.g., in rows or in columns or particular zigzags across the stage). Other example scanning patterns may include concentric arcs, a spiral, or a star pattern. In other examples, the orientation of the light source 310 may be modified in random or semi-random ways as well in order to project the light beam 312 in different directions within the stage. The scanning area may also be constrained to some subsection of the full envelope of some or all of the light source.

The method 100 may then involve receiving a signal when a photosensor has sensed a light beam, as shown by block 130. A control system may receive a signal from one of the photosensors when the photosensor detects a light beam. The signal may be sent to the control system through a wireless connection or a different type of connection, for example. In some examples, the photosensors may be connected together in a mesh network so that signals can be transmitted from one photosensor to the next in sequence. Such examples may be used in situations where a large number of photosensors are placed on a stage in order to quickly transmit data from many photosensors to a control system, for example.

Figure 3B:
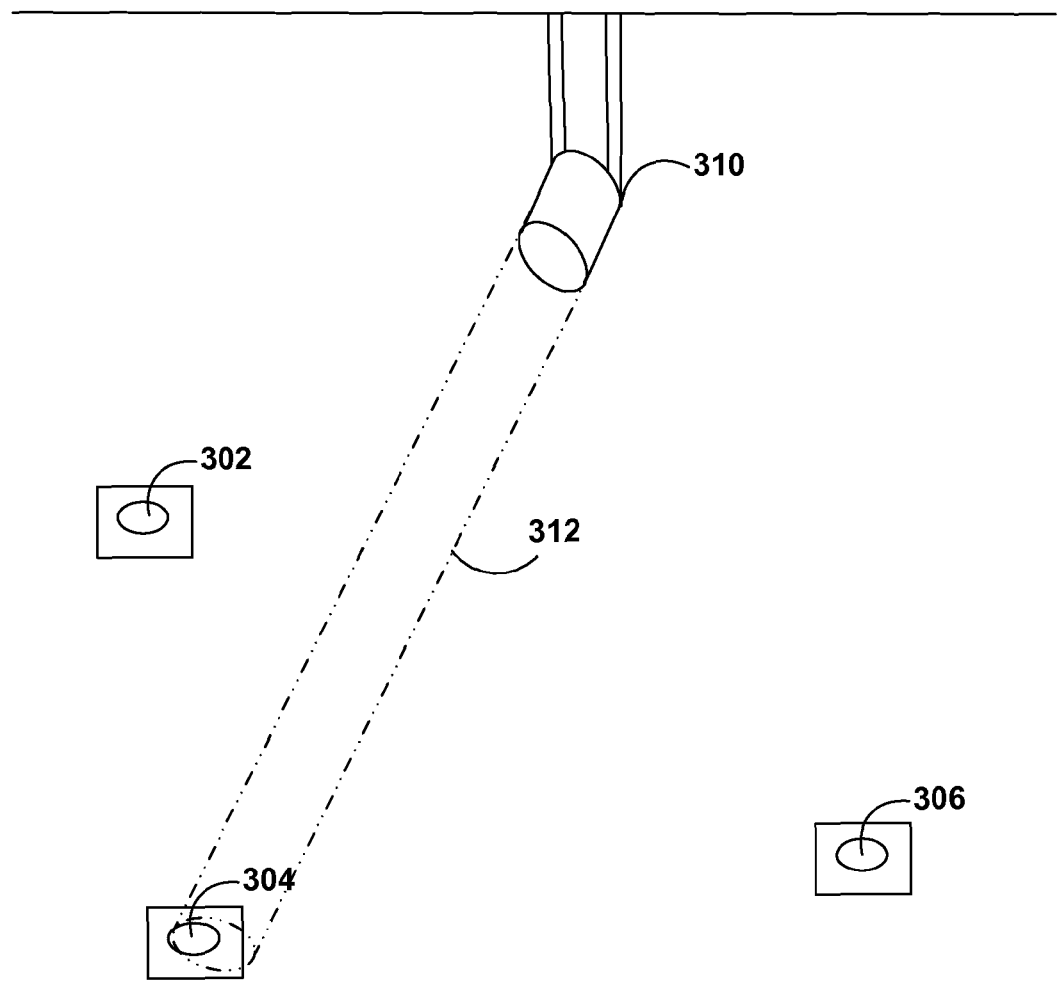
FIG. 3B illustrates a stage containing three photosensors and a light source projecting a light beam at a first photosensor, according to an example embodiment.

FIG. 3B shows another configuration of the light source and photosensors, according to an example embodiment. More specifically, FIG. 3B shows a light source 310 projecting a light beam 312 onto a different point of the stage. The orientation of the light source 310 (e.g., the pan and/or tilt) may be controlled to change the direction of the light beam 312. During this homing sequence, the light beam 312 may at some point be projected in a direction toward one of the photosensors 304, such that the photosensor 304 detects the presence of the light beam 312. The photosensor 304 may then send a signal to a control system indicating that a light beam has been detected. In some examples, the photosensors may each report a unique ID number back to the control system as well so that the control system can identify each photosensor.

The method 100 may then involve determining orientations of the light source that cause a signal at one of the photosensors, as shown by block 140. As the light source is controlled to project a light beam around the stage during the homing sequence, a control system may determine a commanded orientation that was used to control the light source whenever a signal is received from a photosensor indicating a sensing of a light beam. In particular, a closed loop system may be used so that the control system may keep track of the commanded axis values sent to the light source (e.g., pan and tilt) that cause signals at one of the photosensors. The commanded axis values may represent commanded orientations of the light source relative to how the light source was mounted on the stage (which may be unknown). The orientations of the light source causing signals at one of the photosensors could be stored numerically in other ways as well, such as relative directions through space (or angles) from one photosensor to the next.

Referring back to FIG. 3B, when a signal is received from the photosensor 304 indicating the light beam 312 projected by the light source 310 hit the photosensor 304, a control system may determine a commanded orientation that was sent to the light source 310. For example, the control system (which may be the same control system that received a signal from the photosensor 304 or a different control system) may determine the pan and tilt assigned to the light source 310 which caused the signal. The pan and tilt values may indicate how much the pan and tilt of the light source 310 must be changed from an initial (possibly unknown) mounted orientation in order to cause the light source 310 to project the light beam 312 onto the photosensor 304.

In some examples, some of the light sources may contain some amount of built-in error in how commanded orientations correspond to true orientations. For instance, commanded orientations may cause a physical orientation of the light source that is off by a fraction of a degree. In such circumstances, to achieve greater precision, a function may first be determined that relates commanded orientations to true physical orientations of a light source. For instance, true orientations may be measured with an inclinometer or 3D-orientation sensor and compared to commanded orientations in order to determine the function. The function may then be used during the homing sequence to ensure that the determined orientations of a light source causing a signal at one of the photosensors are precise.

Figure 3C:
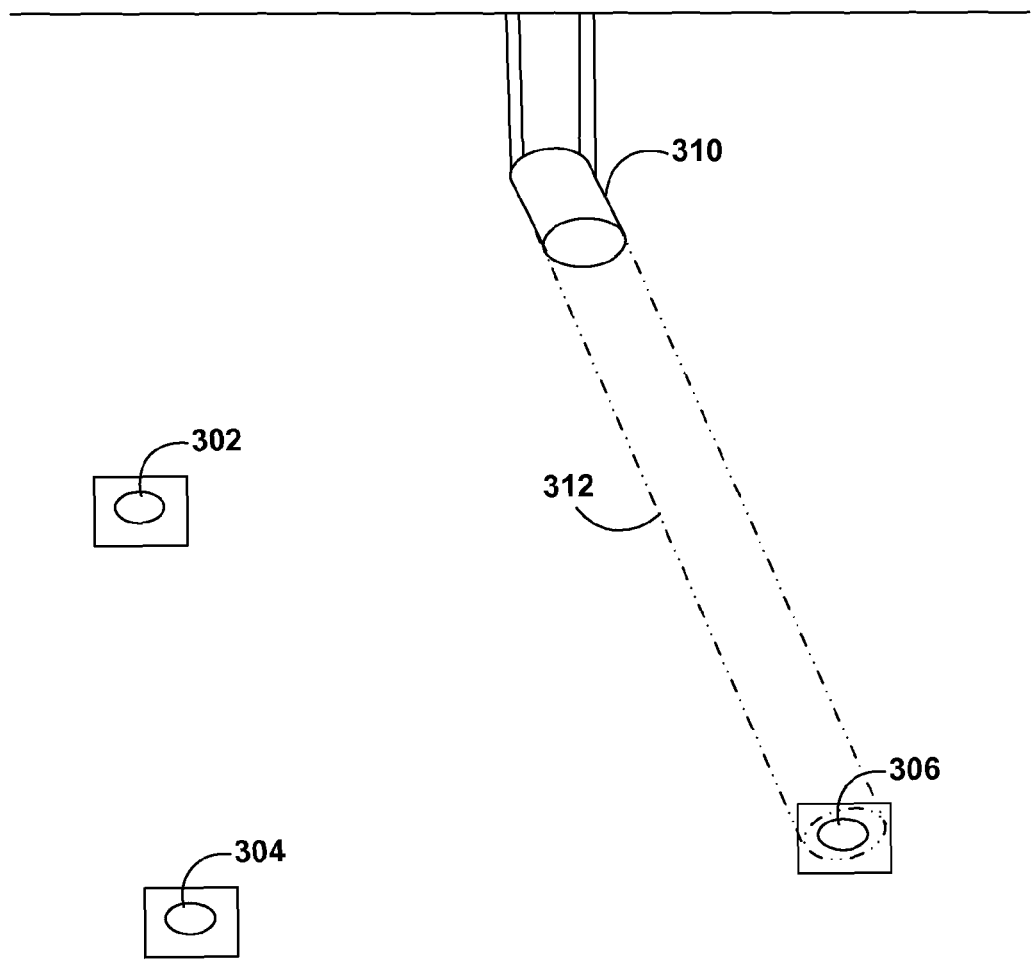
FIG. 3C illustrates a stage containing three photosensors and a light source projecting a light beam at a second photosensor, according to an example embodiment.
Figure 3D:
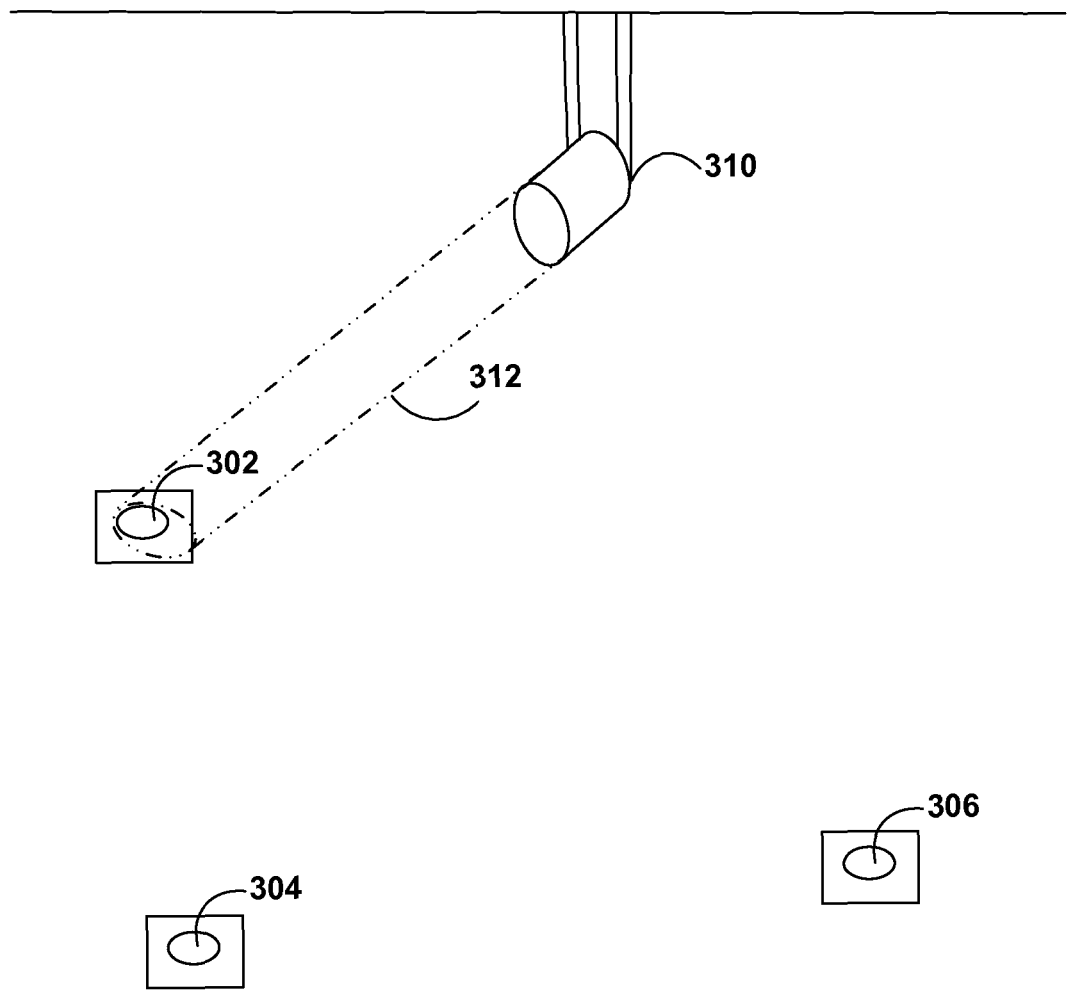
FIG. 3D illustrates a stage containing three photosensors and a light source projecting a light beam at a third photosensor, according to an example embodiment.

The homing process may then be continued until the light source has projected a light beam hitting at least two additional photosensors. For example, FIG. 3C shows the light source 310 projecting a light beam 312 that hits the photosensor 306. A signal may be received from the photosensor 306, and a control system may record the commanded axis values (e.g., pan and tilt) of the light source 310 that caused the signal. After continuing the homing sequence, the light beam 312 projected by the light source 310 may then hit another photosensor 302, as shown by FIG. 3D. A signal may be received from the photosensor 302, and the control system may again record the commanded orientation of the light source 310 that caused the signal, also keeping track of which photosensor corresponds to a particular commanded orientation of the light source. Collectively, FIGS. 3A-3D illustrate an example homing sequence during which the light source 310 has been oriented to project the light beam 312 at three photosensors 302 to 306.

Figure 4:
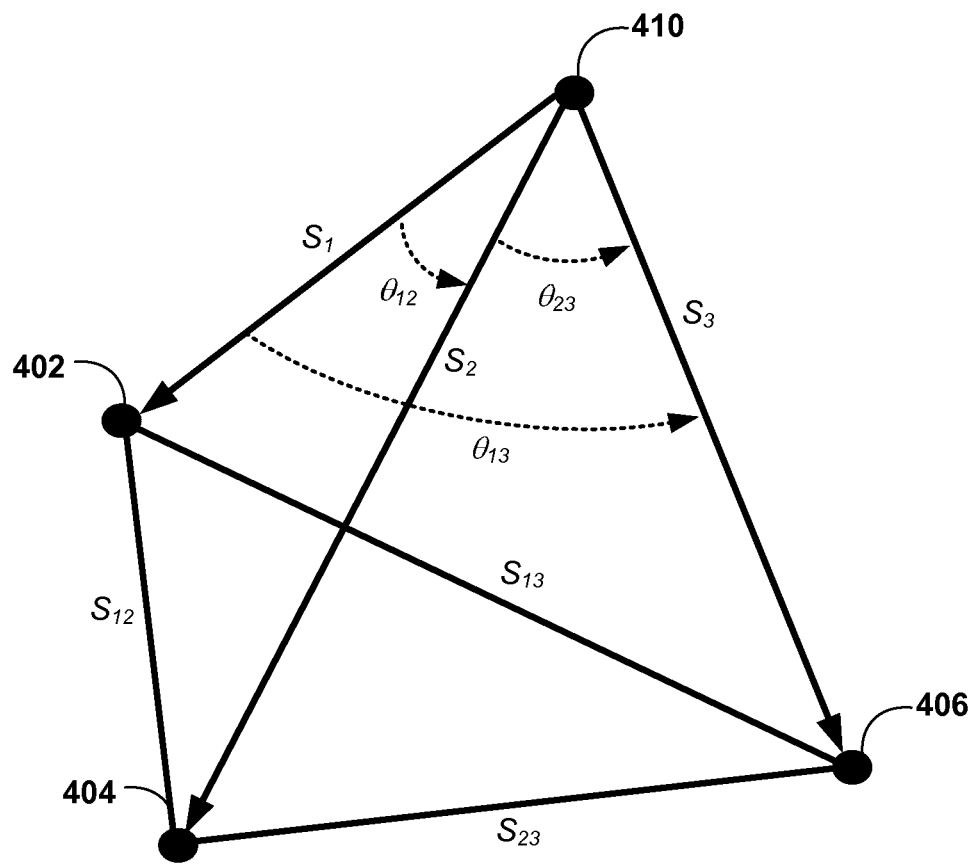
FIG. 4 illustrates directions toward three points with known locations, according to an example embodiment.

FIG. 4 illustrates an abstract representation of data acquired during a homing sequence, according to an example embodiment. The location of three points 402, 404, and 406 relative to a world frame may be known, representing the positions of three photosensors on a stage. The distances between any two of the points 402, 404, and 406 may therefore be computed as $S_{12}$, $S_{23}$, and $S_{13}$. Additionally, the relative directions through space between each of the known points 402, 404, and 406 from an unknown point 410 representing the location of the light source may be determined during the homing sequence. For instance, the difference in pan and tilt causing the light source to project a light beam hitting the point 402 and the pan and tilt causing the light source to project a light beam hitting the point 404 may be used to determine the angle $\theta_{12}$. Similarly, the angle $\theta_{23}$ may be determined based on the change in orientation of the light source from when the light beam hit the point 404 to when the light beam hit the point 406. Additionally, the angle $\theta_{13}$ may be determined based on the change in orientation of the light source from when the light beam hit the point 402 to when the light beam hit the point 406.

The method 100 may then involve using the positions of the photosensors on the stage and the commanded orientations of the light source that caused a signal at one of the photosensors to determine a transformation from a local frame of the light source to the world frame, as shown by block 150. In particular, a translation and a rotation from the local frame of the light source to the world frame may be determined in order to determine how the light source is mounted on a stage (e.g., the position and orientation of the light source relative to the world frame). For example, the transformation may be determined by solving a geometry problem as illustrated by FIG. 4.

In particular, the distances (represented by $S_{12}$, $S_{23}$, and $S_{13}$ in FIG. 4) between the three photosensors may be determined based on the positions of the photosensors. Additionally, the three angles from the light source between any pair of photosensors (represented by $\theta_{12}$, $\theta_{23}$, and $\theta_{13}$ in FIG. 4) may be determined based on the homing sequence. This information may be used to solve for three unknown distances (represented by $S_1$, $S_2$, and $S_3$ in FIG. 4) between the location of the light source 410 and the locations of the photosensors 402, 404, and 406. For instance, the law of cosines may be used on each of three triangles formed by the light source position and two photosensor positions to determine three constraints:

$$S_{12}^2 = S_1^2 + S_2^2 - 2S_1 S_2 \cos \theta_{12}$$

$$S_{23}^2 = S_2^2 + S_3^2 - 2S_2 S_3 \cos \theta_{23}$$

$$S_{13}^2 = S_1^2 + S_3^2 - 2S_1 S_3 \cos \theta_{13}$$

The three constraints can be used to determine values for the distances connecting the unknown point representing the light source in space to each of the known points representing the photosensors. In one example, a closed-form solution may therefore be determined for the distances $S_1$, $S_2$, and $S_3$, which may be used to determine position and/or orientation parameters of the light source. For example, an algorithm referred to as direct linear transformation may be used to first convert the system of three equations into a system of three linear equations, which can then be solved by a standard method (e.g., matrix row reduction).

A number of different possible algorithms could be used to determine the transformation as well. For instance, in some examples, the determined orientations of the light source may contain noise, in which case there may not be an exact solution. In such cases, a transformation may be determined that minimizes an amount of error (such as the mean squared error) in the determined position and orientation of the light source. For example, an iterative approximation algorithm could be used to determine an approximate position and orientation of the light source relative to the stage that minimizes an error term. In further examples, a closed-form solution may be used as an initial estimate for the optimization procedure.

In other examples, additional photosensors may be used to determine the transformation from a local frame of a light source to the world frame. For example, an orientation of the light source causing a signal at four or five or more photosensors may be determined during the homing sequence. Additional photosensors may be used to reduce error caused by imprecise measurements, for example. By capturing additional data, the system of equations used to solve for the transformation may be overdetermined (e.g., more constraints than degrees of freedom). In such examples, a solution for the transformation can be determined which minimizes a total amount of error in each of the determined directions towards photosensors on the stage (e.g., by minimizing the mean squared error in solutions to each of the determined constraints). Sensor data from additional photosensors may be incorporated to verify and/or refine determined positions and orientations of light sources in other ways as well. For example, in some instances, a closed-form solution for the overdetermined three-dimensional resection problem may be determined directly.

In additional examples, an optimization approach may be used in which the coefficients characterizing a light source (e.g., the relationship between commanded orientations and true orientations of the light source) serve as additional degrees of freedom. Such an approach may be useful when the light sources contain some built-in error between commanded and true orientations. By including the coefficients as additional degrees of freedom, the step described above of building a function to describe the relationship between commanded and true orientations can be avoided.

Figure 5A:
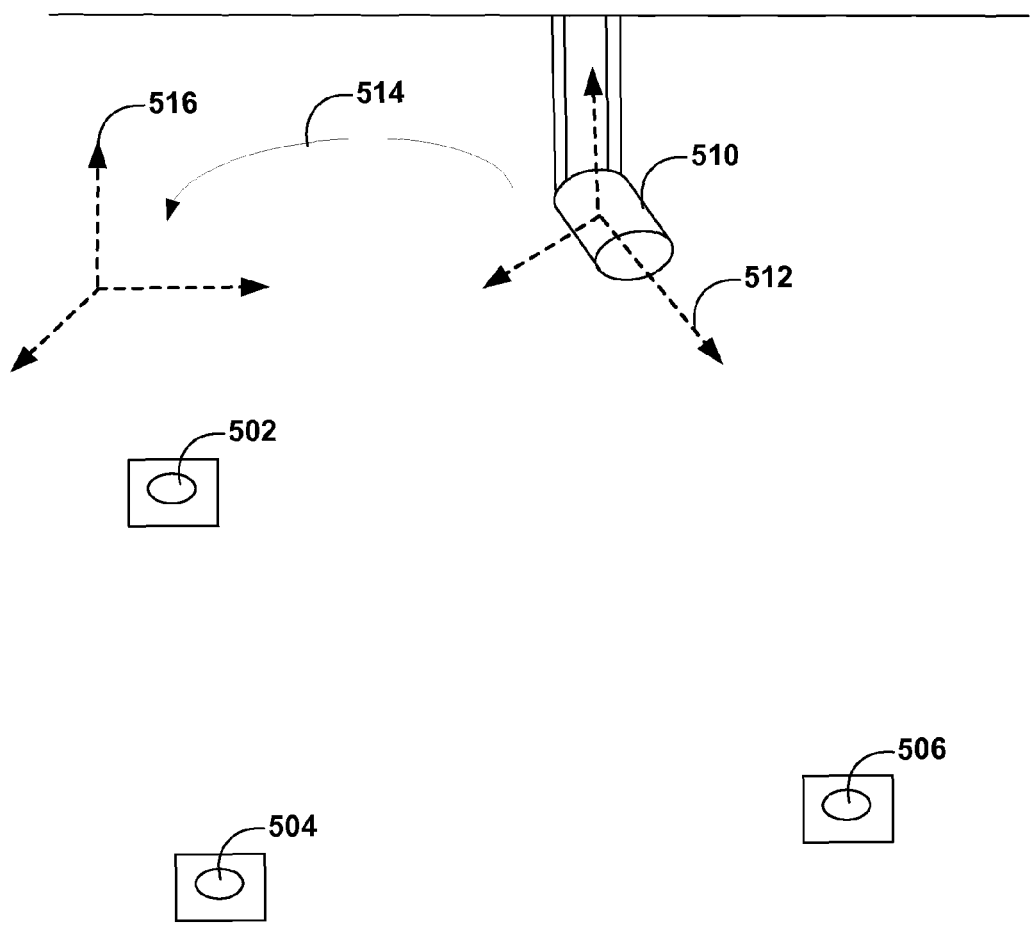
FIG. 5A illustrates a local frame of a light source and a world frame, according to an example embodiment.

FIG. 5A shows a local frame of a light source and a world frame, according to an example embodiment. The world frame 516 may be positioned somewhere within an environment and may first be used in determining positions of the photosensors 502, 504, and 506. Then, using the methods described above, a transformation 514 from a local frame 512 of the light source 510 to the world frame 516 may be determined. In particular, the local frame 512 of the light source 510 may indicate how the light source 510 is mounted within the stage (in this example, on the ceiling). Additionally, the transformation 514 may indicate how to translate and rotate the local frame 512 of the light source 510 to make it align with the world frame 516. In some examples, the transformation 514 may not be a full transformation in each translation and orientation direction. For instance, a light source may be mounted on the floor such that the vertical position of the light source relative to the stage is already known. In such examples, a transformation may be determined in only certain translation and/or orientation directions.

Figure 5B:
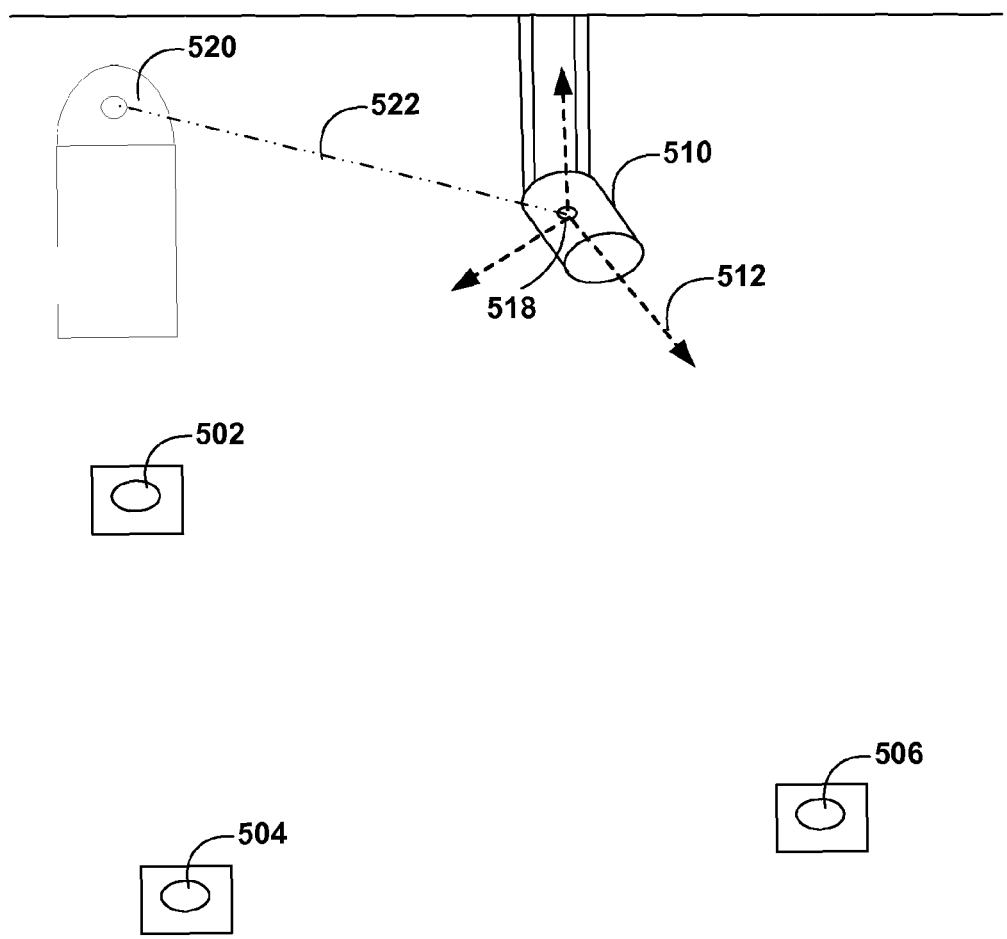
FIG. 5B illustrates a local frame of a light source and a laser tracker, according to an example embodiment.

In further examples, various methods may be used to confirm the accuracy of a determined transformation and/or refine the transformation for further precision. For example, FIG. 5B illustrates a local frame of a light source and a laser tracker, according to an example embodiment. As shown, an optical target 518 may be affixed on the light source 510 at a predetermined point, with a known position relative to the local frame 512 of the light source 510. A laser tracker 520, such as the laser tracker described above with respect to FIG. 2C, may then project a laser beam 522 toward a point in the world where the optical target 518 on the light source 512 should be, assuming the determined transformation was accurate. In some examples, if the transformation is off by a small amount, the transformation may be adjusted so that the optical target 518 lines up with the laser beam 522 from the laser tracker 520. In other examples, if the transformation is off by a greater amount (e.g., if the optical target 518 is further away from the predicted location than a threshold amount), the homing sequence may be repeated to determine a new transformation.

Figure 6A:
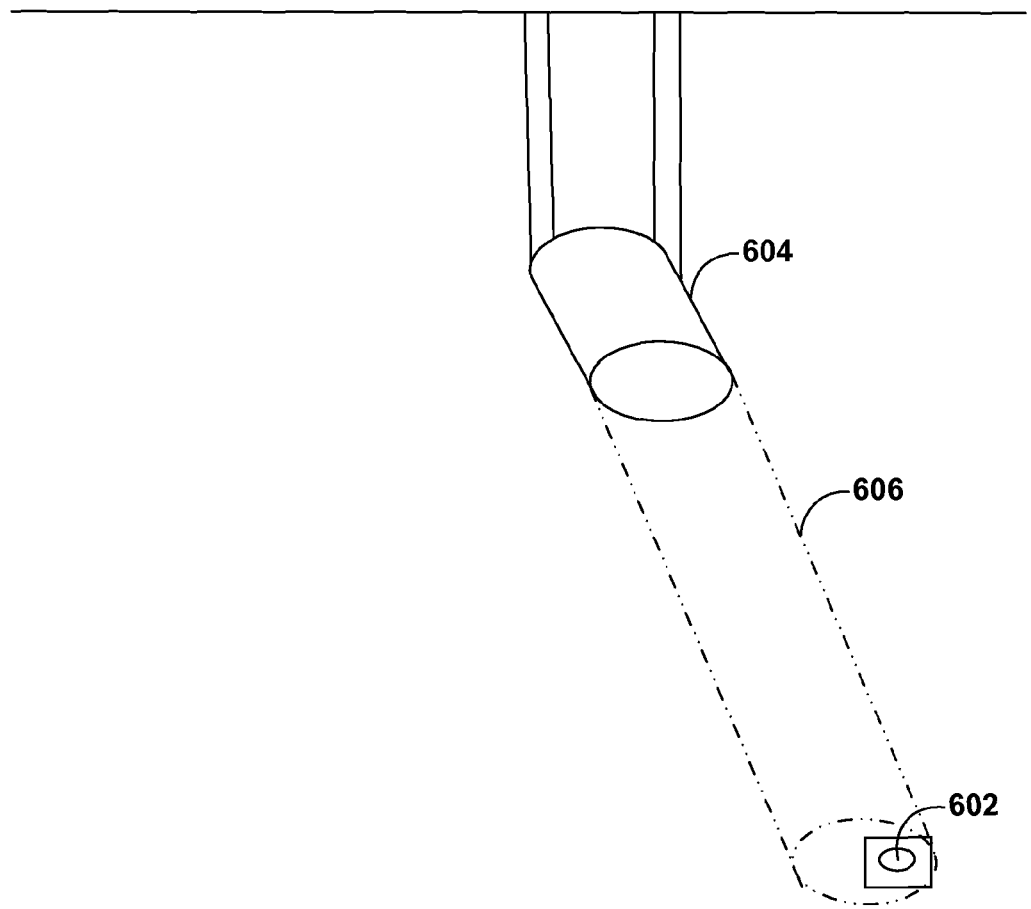
FIG. 6A illustrates a light source projecting a light beam at a photosensor, according to an example embodiment.

In further examples, a hunting sequence may be used to refine the determined orientations of a light source that cause a signal at one of the photosensors. For instance, in some applications, a light source may project a light beam that is greater in size than each of the photosensors (e.g., 5 times greater or 20 times greater or 100 times greater). In such examples, a light beam may hit a photosensor without being directly centered over the photosensor. For example, FIG. 6A shows an example of a light beam hitting a photosensor which is not directly centered over the photosensor, according to an example embodiment. As shown, a light source 604 may project a light beam 606 which is greater in size than a photosensor 602. Accordingly, the photosensor 602 may trigger a signal whenever a certain part of the light beam 606 is hitting the photosensor 602.

Figure 6B:
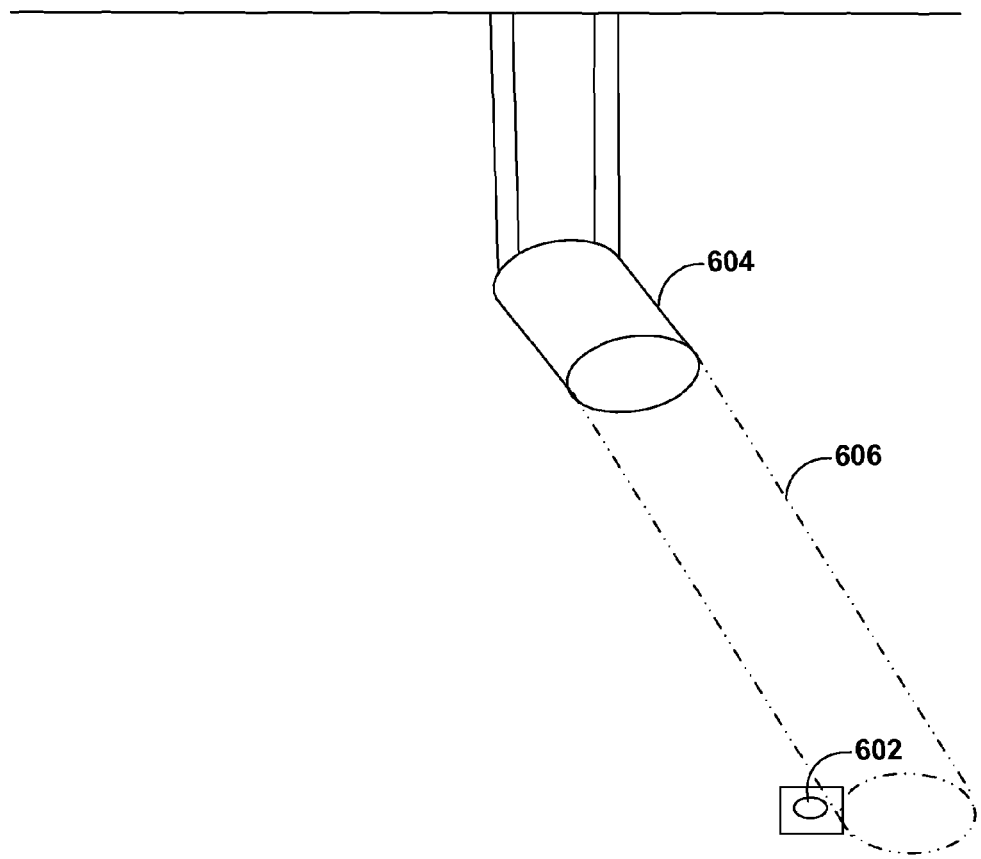
FIG. 6B illustrates a light source projecting a light beam to the right of a photosensor, according to an example embodiment.

In such examples, an orientation of the light source may be determined such that the photosensor is located at a center point of the projected light beam using a centering sequence. In one example, the orientation of the light source 604 may be controlled so that the light beam 606 is first projected to the right of the photosensor 602, as shown by FIG. 6B. The light beam 606 may be moved to the right until it reaches a point where the photosensor 602 no longer sends a signal indicated that the photosensor 602 is sensing the light beam 606. The orientation of the light source 604 may be determined which projects the light beam 606 just to the right of the photosensor 602.

Figure 6C:
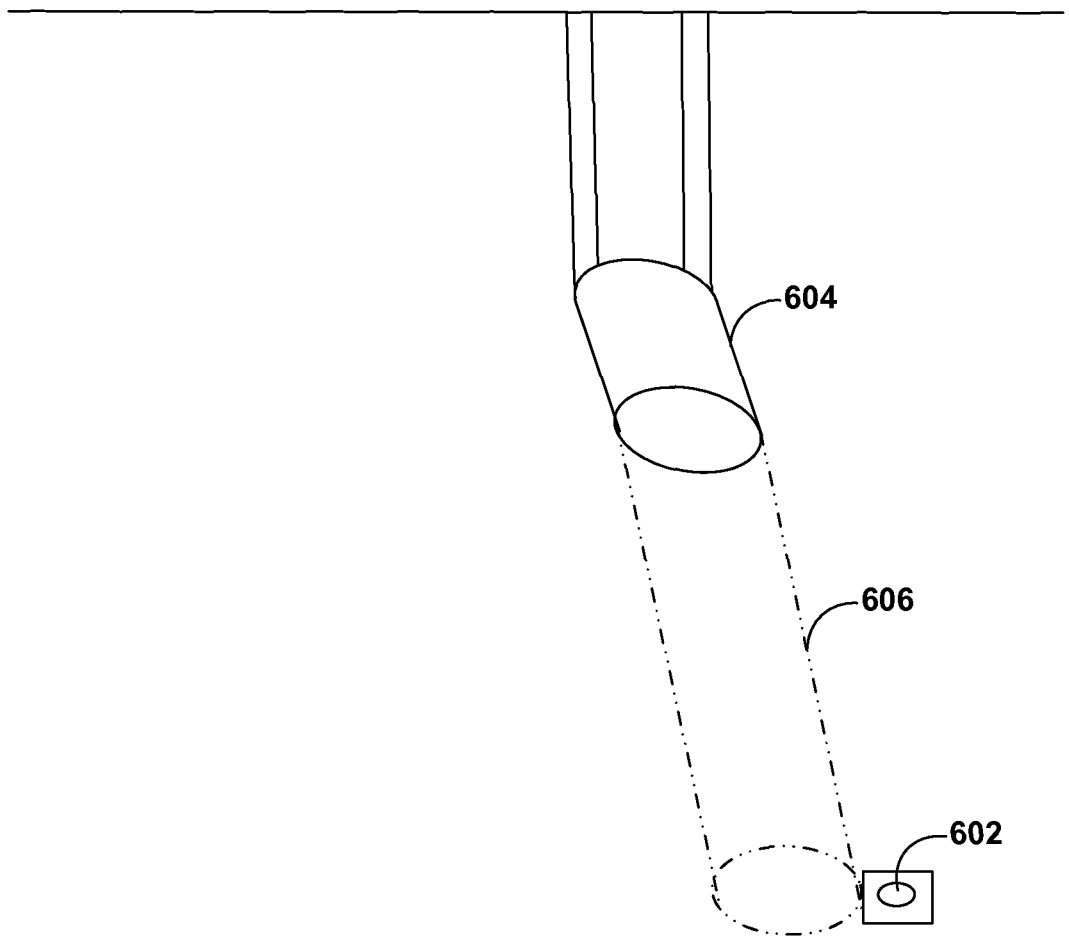
FIG. 6C illustrates a light source projecting a light beam to the left of a photosensor, according to an example embodiment.

Then, the orientation of the light source 604 may be controlled so that the light beam 606 is projected to the left of the photosensor 602, as shown by FIG. 6C. The light beam 606 may be moved to the left until it reaches a point where the photosensor 602 no longer sends a signal indicated that the photosensor 602 is sensing the light beam 606. The orientation of the light source 604 may be determined which projects the light beam 606 just to the left of the photosensor 602. Then, an average of the orientation of the light source which projects a light beam to the right of the photosensor 602 and the orientation of the light source which projects a light beam to the left of the photosensor may be determined to find an orientation of the light source that projects a light over the center of the photosensor in the left-right direction.

Figure 6D:
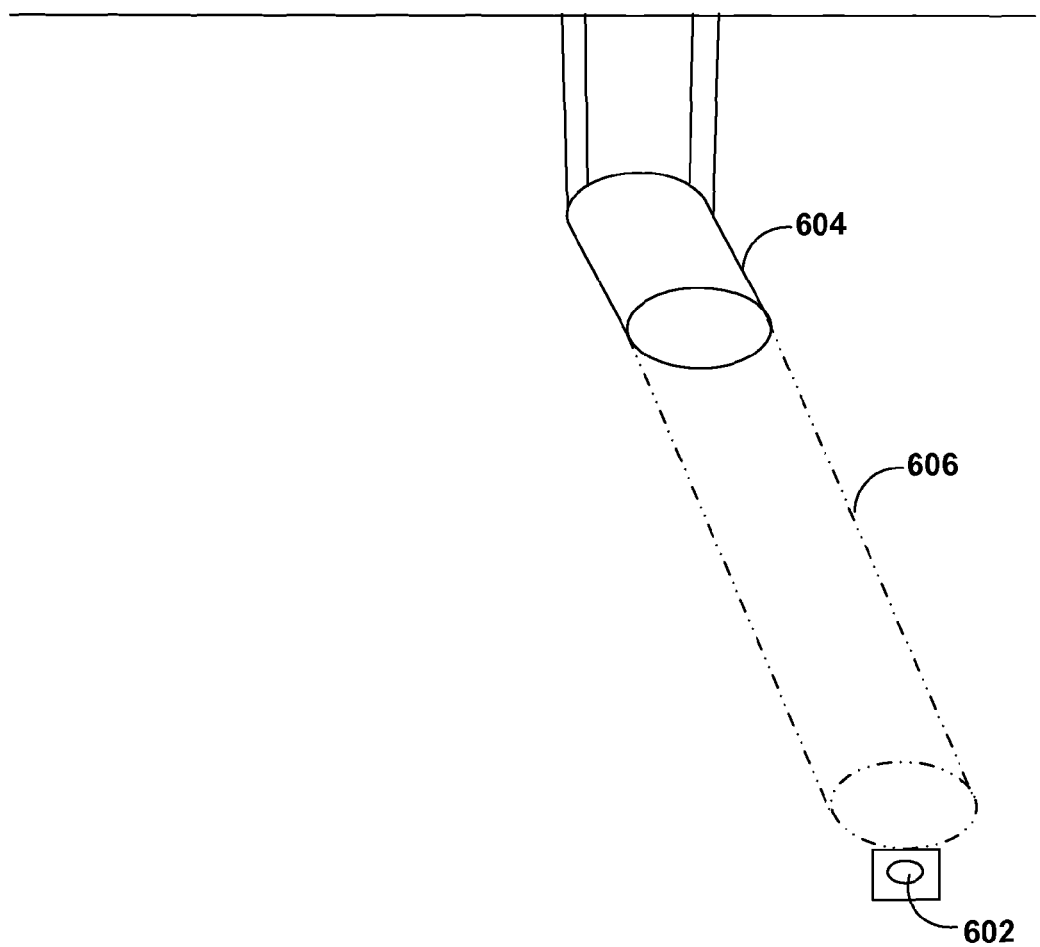
FIG. 6D illustrates a light source projecting a light beam above a photosensor, according to an example embodiment.

The process may then be repeated in the up and down direction (e.g., along the Y-axis of the stage). First, the orientation of the light source 604 may be controlled so that the light beam 606 is projected above the photosensor 602, as shown by FIG. 6D. The light beam 606 may be moved up until it reaches a point where the photosensor 602 no longer sends a signal indicated that the photosensor 602 is sensing the light beam 606. The orientation of the light source 604 may be determined which projects the light beam 606 just to the top of the photosensor 602.

Figure 6E:
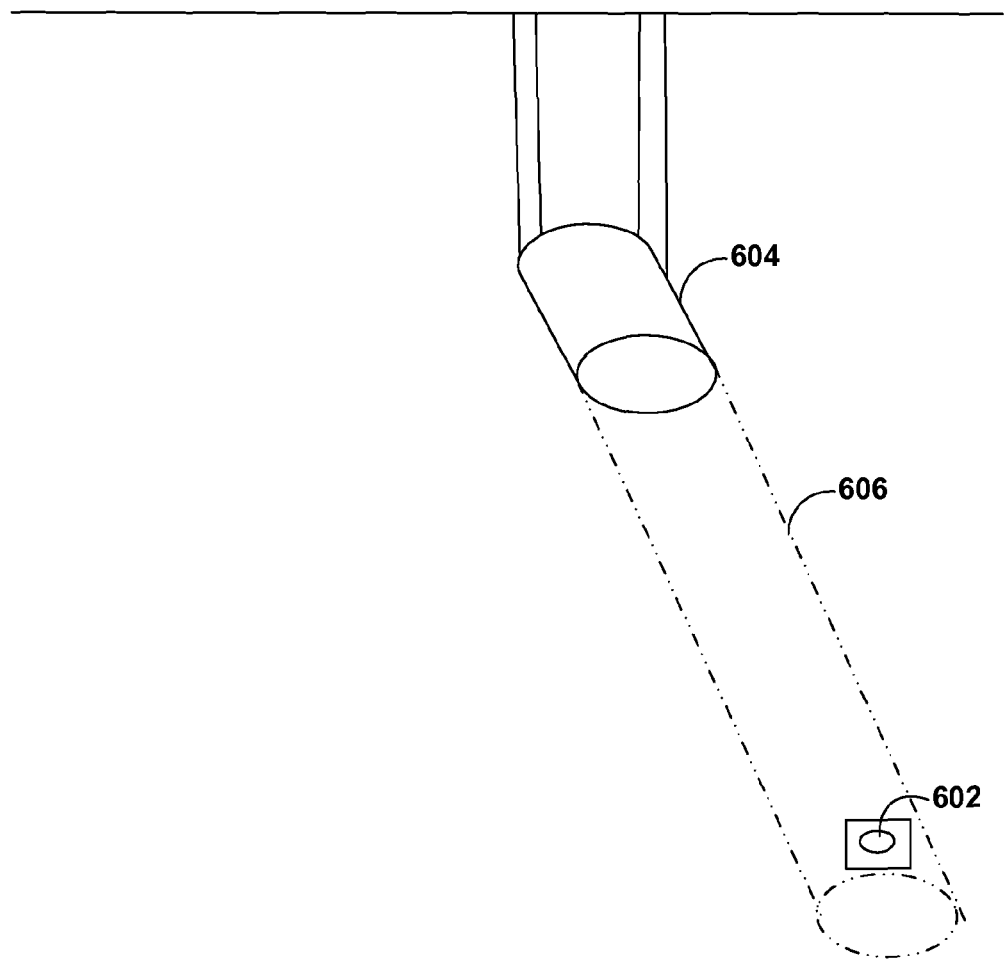
FIG. 6E illustrates a light source projecting a light beam below a photosensor, according to an example embodiment.
Figure 6F:
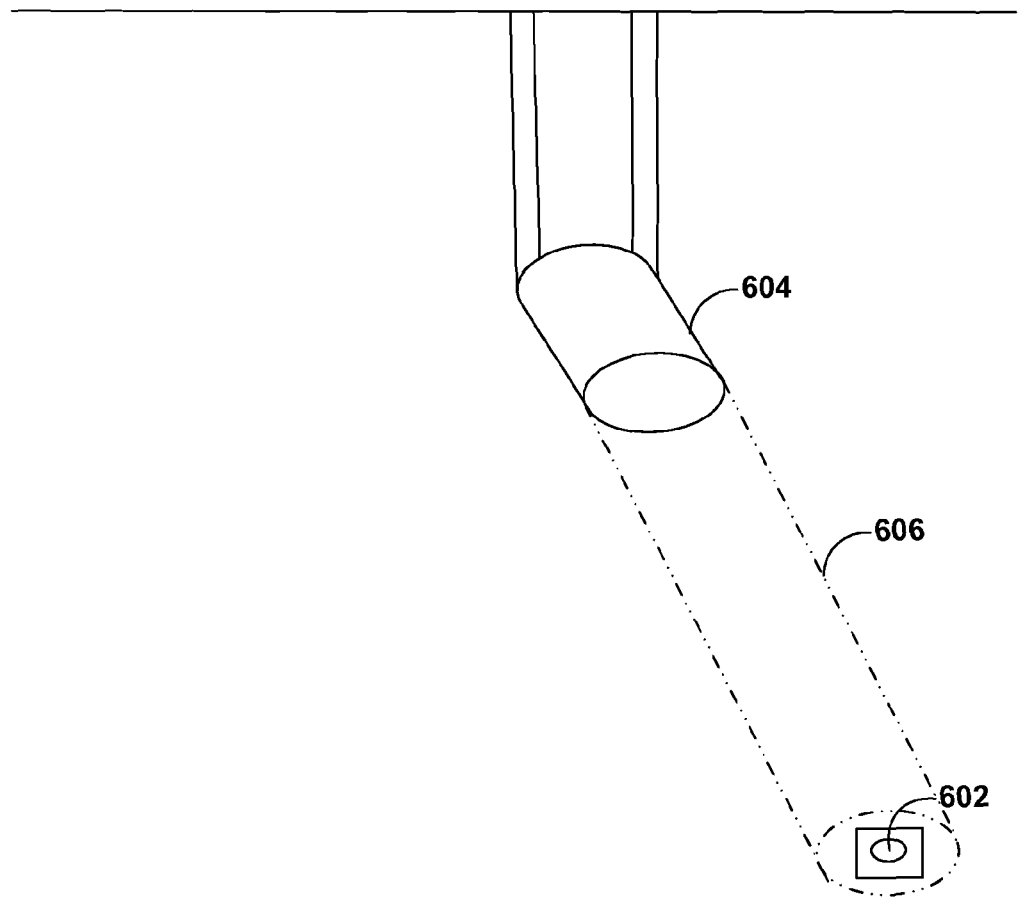
FIG. 6F illustrates a light source projecting a light beam such that a photosensor is located a center point of the light beam, according to an example embodiment.

Then, the orientation of the light source 604 may be controlled so that the light beam 606 is projected below the photosensor 602 (e.g., along the Y-axis of the stage), as shown by FIG. 6E. The light beam 606 may be moved down until it reaches a point where the photosensor 602 no longer sends a signal indicated that the photosensor is sensing the light beam 606. The orientation of the light source 604 may be determined which projects the light beam 606 just below the photosensor 602. Then, an average of the orientation of the light source which projects a light beam above the photosensor 602 and the orientation of the light source which projects a light beam below the photosensor may be determined to find an orientation of the light source that projects a light over the center of the photosensor in the up-down direction. The determined orientation of the light source may now project a light beam such that the photosensor is at a center point of the light beam, as shown by FIG. 6F.

In additional examples, the light beam may be moved in different direction during the centering sequence. For instance, if a photosensor is mounted on a wall within a stage, the light beam may be moved up and down in the Z-direction to determine when the photosensor is at the center of the beam in the Z-direction. In additional examples, light beams may be moved along paths that don't align with one of the axes (e.g., at a 45 degree angle between the X-axis and the Y-axis). In yet further examples, the centering sequence may be repeated in additional directions in order to achieve additional precision as well. For instance, the centering sequence may be repeated along the first axis again to ensure that the centering process is executed using the widest part of a light beam.

In further examples, a profile of the photosensor readings may be maintained during the centering process. The profile may be used to confirm that the center of a light beam corresponds to a measurement of highest intensity by the photosensor. In cases where the center of the light beam does not correspond to the highest intensity (or at least close to the highest intensity), the centering process may be repeated along different axes, for example.

In other examples, after centering a light beam, the size of the light beam may be decreased. If the photosensor still detects the light beam, the centering process may be repeated with the smaller beam to achieve additional precision. If the photosensor does not detect the smaller light beam, the centering sequence may be repeated with the normal-size light beam in order to achieve a more precise orientation. In any case where the centering process in repeated, if the centering process does not finish successfully after a certain number of retries, an error may be recorded and the homing sequence may continue using different photosensors.

In some examples, additional methods may be used to further refine determined transformations from a local frame of a light source to a world frame as well. For example, laser projectors may be mounted on the light sources, and laser beams from the laser projectors may be used along with a camera system capable of detecting where the laser beams are projected within a stage. The locations of the laser beams may be used to refine a determined transformation to provide greater precision during the homing sequence, for example. In additional examples, traditional computer vision methods may be used to determine the position of projected light beams within a stage in order to refine determined transformations as well or instead.

Once a light source has been calibrated relative to a stage, the light source may be controlled to project light beams at particular targets on the stage. For instance, the determined transformation from a local frame of the light source to a world frame may be used to determine how to orient the light source in order to project light beams at other aspects of the stage with known positions relative to the world frame, such as mirrors, screens, devices, or actors on a stage. By determining a precise calibration of the light source, light beams from the light source may then be coordinated with other components on stage during a wide variety of different types of shows or performances, for example.

III. Example Systems and Methods for Calibrating Multiple Light Sources

In some examples, multiple light sources within an environment may be calibrated. Accordingly, the position and orientation of one light source relative to another may be determined so that the light sources may be controlled to project light beams in a coordinated manner, for instance, as part of a light show. In some examples, the light sources may be calibrated in sequence, one after another, by using the same set of photosensors. In other examples, different groups of photosensors located in different sections of the stage may be used to calibrate different light sources at the same time. In additional examples, some or all of the photosensors may be used to calibrate multiple light sources simultaneously by detecting one or more identifying characteristics of detected light beams.

For instance, multiple light sources may be calibrated simultaneously during a single homing sequence by using color to distinguish light beams from different light sources. In some examples, the photosensors may be RGB photosensors capable of determining RGB values associated with the RGB colors of detected light beams. Additionally, the light sources may be capable of projecting light beams with different colors. A control system may then be configured to command each of the light sources to project light beams with different RGB colors during the homing sequence. When a photosensor sends a signal indicating that it has detected a light beam, the photosensor may also report the color of the detected light beam. The control system may then use the RGB color of the detected light beam to identify which light source projected the light beam during the homing sequence. In some examples, pure red, green, and blue light beams may be used to calibrate up to three light sources simultaneously. In other examples, colors that include a mix of red, green, and/or blue could be used as well to calibrate dozens of light sources or more at the same time.

Figure 7A:
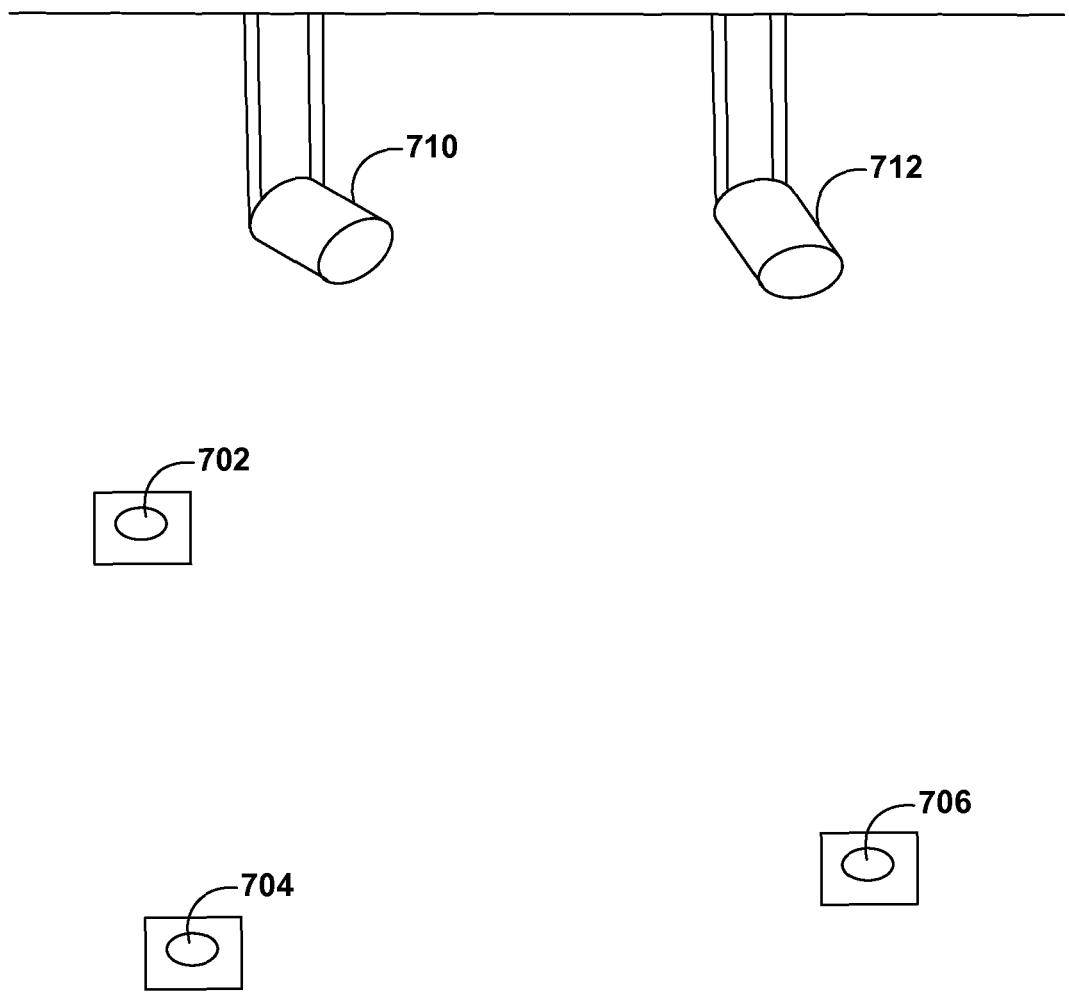
FIG. 7A illustrates a stage containing three photosensors and two light sources, according to an example embodiment.

FIG. 7A shows a stage containing two lights sources and three photosensors, according to an example embodiment. The photosensors 702, 704, and 706 may be RGB photosensors capable of determining the RGB color of a detected light beam. Additionally, the photosensors 702, 704, and 706 may be positioned on the stage such that each of the light sources 710 and 712 has an unobstructed direction from which it can project a light beam that will hit the photosensor. The light sources 710 and 712 are shown in the Figure as overhead lights, but they could be mounted at other positions on the stage as well. Each light source 710 and 712 may be any type of light source capable of projecting light beams with different RGB colors based on instructions from a control system. The light sources 710 and 712 may be the same type of light or they may have different manufacturers, models, and/or sizes in some examples as well.

Figure 7B:
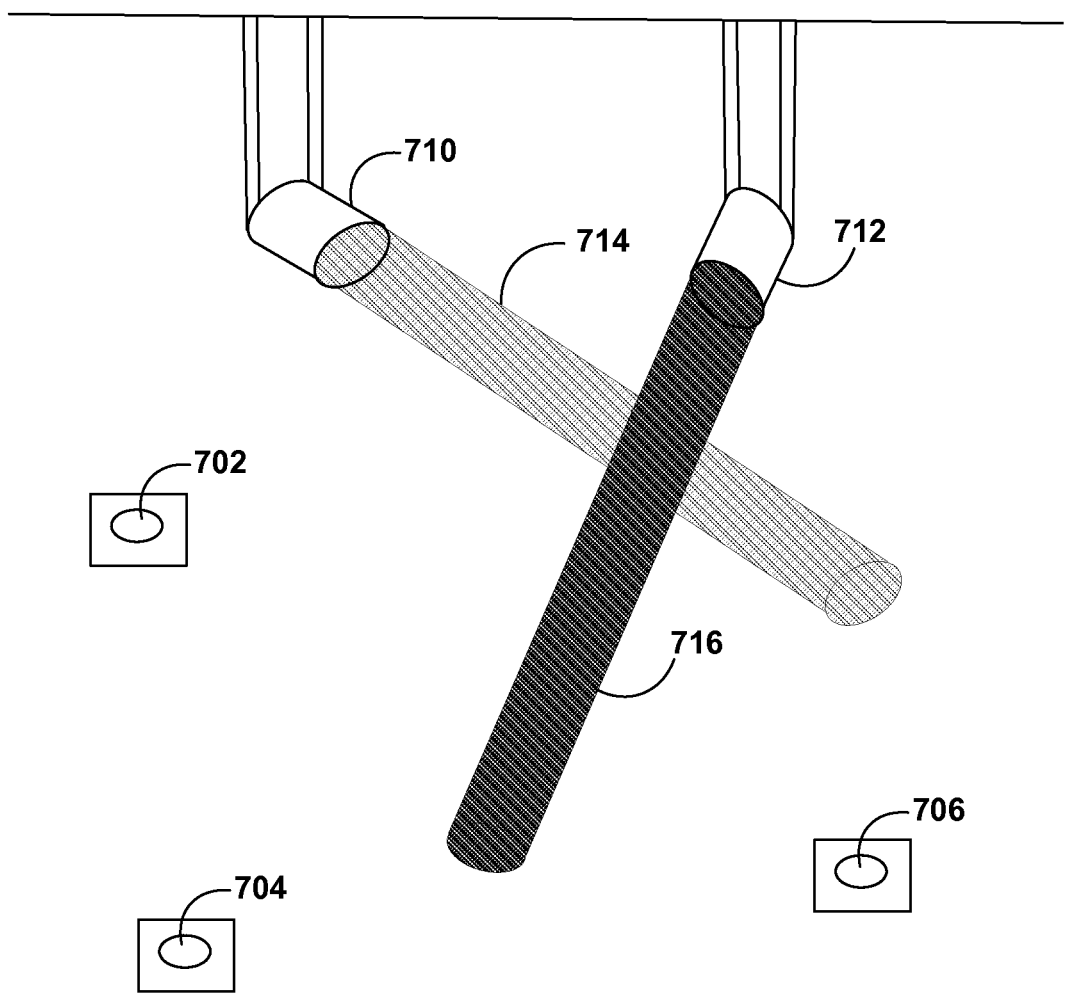
FIG. 7B illustrates a stage containing three photosensors and two light sources projecting light beams with different colors, according to an example embodiment.

FIG. 7B shows a stage containing two light sources each projecting a light beam with a different color, according to an example embodiment. As shown, a first light source 710 may be controlled to project a light beam 714 with a first color. Additionally, a second light source 712 may be controlled to project a light beam 716 with a second color. The colors may be chosen to be sufficiently different that the photosensors 702, 704, and 706 may be capable of distinguishing between light beams of the different colors.

Figure 7C:
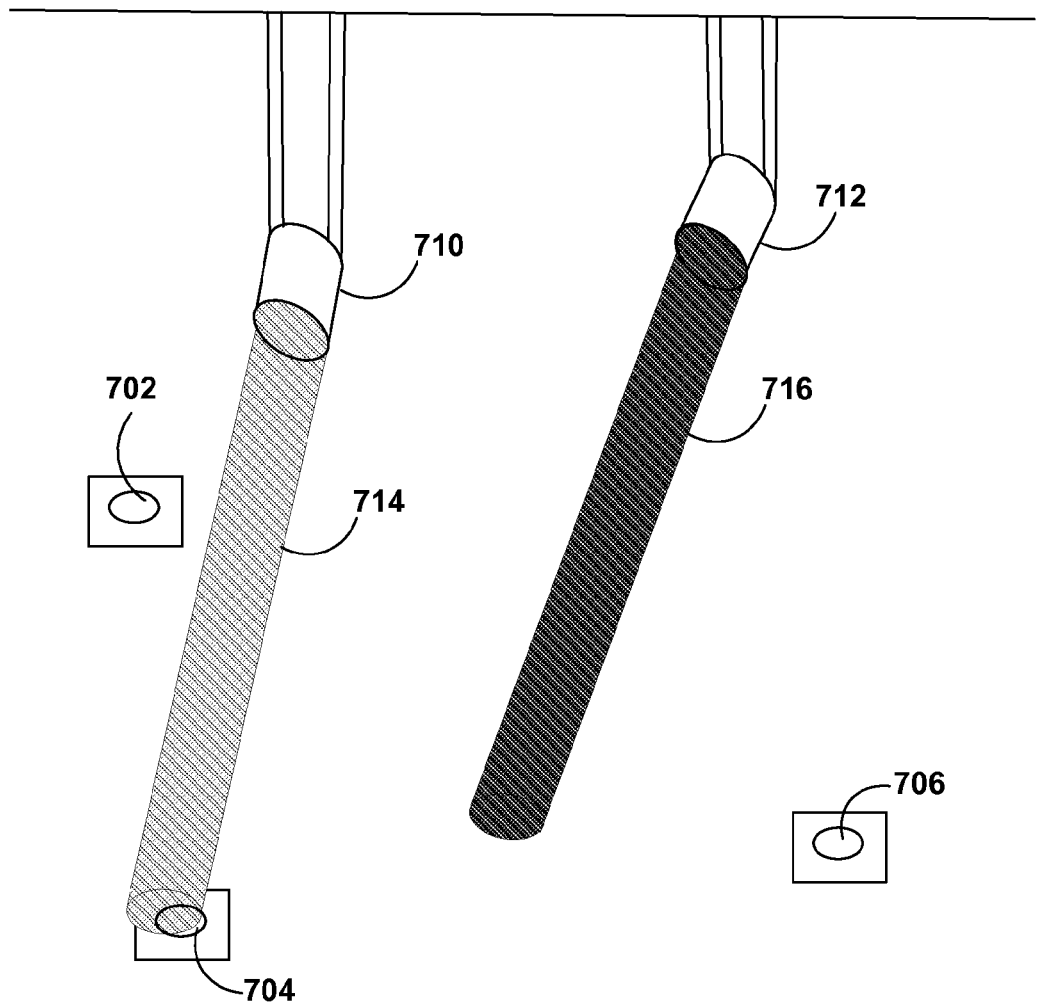
FIG. 7C illustrates the stage from FIG. 7B containing three photosensors and two light sources projecting the light beams such that a light beam from the first light source hits a photosensor, according to an example embodiment.

The control system may then control the orientations of the light sources 710 and 712 to project the light beams of different colors in different directions during a homing sequence. At some point, a light beam from one of the light sources may hit one of the photosensors, as shown by FIG. 7C. As shown, the photosensor 704 may detect the presence of a light beam 714 as well as the color of the light beam 714. A control system may then determine based on the color of the light beam 714 that the light source 710 projected the light beam 714 which was detected by the photosensor 704. The control system may keep track of the orientation of the light source 710 that caused a signal to be sent by the photosensor 704 as in the examples described above for calibrating a single light source.

Figure 7D:
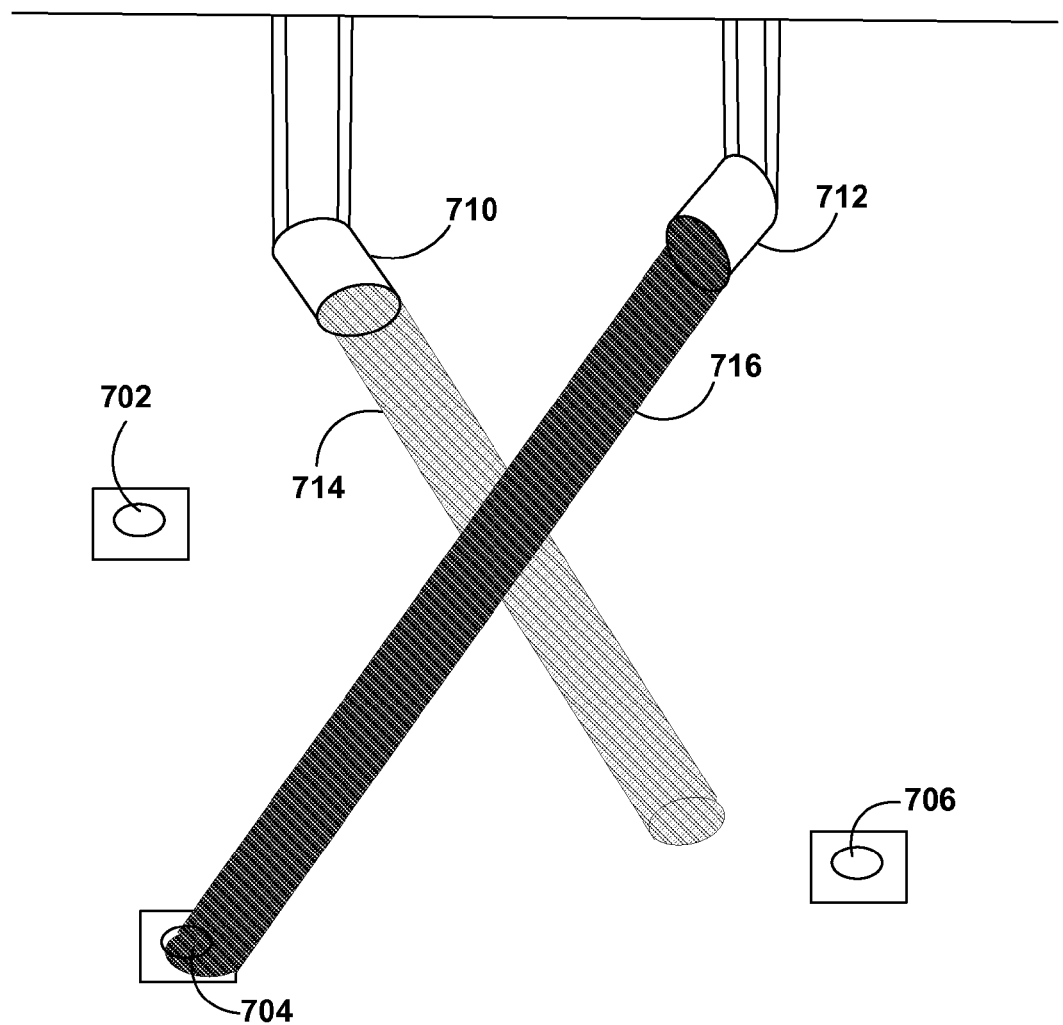
FIG. 7D illustrates the stage from FIG. 7B containing three photosensors and two light sources projecting the light beams such that a light beam from the second light source hits a photosensor, according to an example embodiment.

The homing sequence may then be continued so that a light beam from one of the light sources may again hit one of the photosensors, as shown by FIG. 7D. As shown, the photosensor 704 may again detect the presence of a light beam 716 as well as the color of the light beam 716. A control system may then determine based on the color of the light beam 716 that the second light source 712 projected the light beam 716 which was detected by the photosensor 704. The control system may also keep track of the orientation of the second light source 712 that caused a signal to be sent by the photosensor 704.

The process may be continued until each light source has projected a light beam that was detected by at least three photosensors. Then, the procedure described above in the examples for calibrating a single light source may be used to determine the position and orientation of each light source relative to the stage. In some examples, the control system may stop moving a light source during the homing sequence once the light source has been detected by three photosensors. In other examples, the control system may continue to change the orientations of all of the light sources until every light source has been detected by at least three photosensors (e.g., to collect extra data in order to achieve greater precision in determining how and where the different light sources are mounted). Additionally, a light source may be temporarily turned off when directed at a photosensor that has already detected the light source.

In other examples, different identifying features of projected light beams may be used as well or instead in order to differentiate between light beams from different light sources. For example, each light source may be controlled to project a light beam with a different frequency, beam pattern, beam strength, beam size, or strobing pattern, for example. In some examples, multiple different properties of the light beams may be modified simultaneously in order to achieve greater confidence in differentiating between light beams from different light sources.

In additional examples, the control system may be configured to automatically account for difficulties in identifying light beams from different light sources. For example, if the photosensors cannot distinguish between two colors of two light beams from different light sources, the control system may instruct one of the light sources to change the color of its light beam or the control system may turn off one of the light sources until the other light source has been fully calibrated.

In other examples, the light sources may be stopped and blinked separately during the homing sequence in order to identify which light source caused a signal at one of the photodectors. For instance, during the scan, when one of the photosensors detects a light, all the light sources may be commanded to stop. At this point, if none of the photosensors detect a light, the light sources may not have stopped in time due to latency in communication. All the light sources may then be rewound (i.e., change their orientations in reverse) until a photosensor detects a light. Then, all of the light sources may be quickly blinked in succession in order to determine which light source caused a signal at the photosensor.

In some examples, a homing sequence may end when each of the light sources has been detected by a certain number of photosensors and/or when each of the light sources has scanned its entire envelope. In further examples, a control system may then report the results of a scan, including any errors in the process (e.g., when a photosensor could not detect a light source with sufficient precision). In some examples, some subset of the scans may be re-run and/or one or more refinement processes may be run using values collected in the previous iteration.

In additional examples, rather than submitting commanded orientation values for calibration at the end of the homing sequence, a control system may run a calibration determination system on-line, so that the estimates of the positions and/or orientations of light sources are refined while the homing sequence goes on. This may increase the speed of the homing process (e.g., by restricting the search space) and/or improve the accuracy of the homing sequence (e.g., by adjusting the focus of a beam based on the distance of a sensor to create "harder" edges of light beams for detection).

In further examples, any of the different examples of systems and methods described with respect to a single light source may be used to calibrate multiple light sources as well. For instance, a high-precision laser tracker may be used to verify the determined transformation for each light source. Any light source that has not been calibrated within a threshold error limit may then repeat the homing process in order to acquire additional position data, for example.

A stage containing dozens or hundreds of light sources may therefore be calibrated within a short time period. In some examples, a single control system may communicate with all of the light sources and photosensors. In other examples, control may be dispersed across multiple computing devices, which may be in communication with one other through a wireless connection, for example. In additional examples, the photosensors may be connected by a mesh network so that detected signals can be sent from one photosensor to the next in order to reach a control system faster. Other configurations are also possible, depending on the properties of the stage and devices to be calibrated.

IV. Conclusion

The examples given in the preceding sections are meant for purposes of explanation and are not meant to be limiting. Other types of systems and/or applications may benefit from the disclosed systems and methods for calibrating light sources as well, without departing from the spirit or scope of the subject matter presented herein.

Further, the above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

We claim:

1. A computer-implemented method comprising:
   determining a position of at least three photosensors relative to a world frame;
   controlling an orientation of at least two light sources so as to cause the at least two light sources to project respective light beams across an area encompassing the at least three photosensors;
   receiving, from the at least three photosensors, signals indicating a sensing of a light beam directed at one of the photosensors;
   after receiving a signal indicating the sensing of a light beam directed at one of the photosensors, causing the at least two light sources to stop;
   causing two or more of the at least two light sources to blink respective light beams in succession in order to identify a light source that caused the received signal;
   determining orientations of each identified light source that caused a signal at one of the photosensors; and
   based on the position of the at least three photosensors and the orientations of each identified light source that caused a signal at one of the photosensors, determining respective transformations from respective local frames of the at least two light sources to the world frame.

2. The method of claim 1, wherein determining the position of the at least three photosensors relative to the world frame comprises mounting the at least three photosensors on a pre-measured rigid frame.

3. The method of claim 1, wherein determining the position of the at least three photosensors relative to the world frame comprises measuring the position of a photosensor using a laser tracker.

4. The method of claim 1, wherein determining the position of the at least three photosensors relative to the world frame comprises receiving position data from a position sensor located on one of the photosensors.

5. The method of claim 1, wherein controlling the orientation of the at least two light sources comprises controlling a pan and a tilt of the at least two light sources.

6. The method of claim 1, further comprising after determining an orientation of a light source that causes a signal at one of the photosensors:
   controlling the light source to cause a light beam to move in at least one direction until the light source reaches a first orientation where the light beam is no longer sensed by the photosensor;
   controlling the light source to cause the light beam to move in an opposite direction of the at least one direction until the light source reaches a second orientation where the light beam is no longer sensed by the photosensor; and
   refining the determined orientation based on an average of the first orientation and the second orientation.

7. The method of claim 1, wherein determining the transformation from a local frame of a light source to the world frame comprises determining a translation and rotation of the local frame relative to the world frame.

8. The method of claim 1, further comprising:
   causing the at least two light sources to project light beams with different colors simultaneously;
   determining a color of a light beam sensed by one of the photosensors; and
   using the color of the light beam sensed by the photosensor to determine a respective light source that projected the light beam.

9. The method of claim 1, further comprising:
causing the at least two light sources to project light beams with different frequencies simultaneously;
determining a frequency of a light beam sensed by one of the photosensors; and
using the frequency of the light beam sensed by the photosensor to determine a respective light source that projected the light beam.

10. The method of claim 1, further comprising refining the transformation from the local frame of a light source to the world frame by projecting a laser tracker at a sensor on the light source.

11. The method of claim 1, further comprising using the transformation from the local frame of a light source to the world frame to determine one or more inaccuracies in commanded positions of the light source.

12. The method of claim 1, wherein the signals indicating the sensing of a light beam directed at one of the photosensors are received from a mesh network connecting the photosensors.

13. A system, comprising:
at least three photosensors;
at least two light sources;
and a control system configured to:
determine a position of the at least three photosensors relative to a world frame;
control an orientation of the at least two light sources so as to cause the at least two light sources to project respective light beams across an area encompassing the at least three photosensors;
receive, from the at least three photosensors, signals indicating a sensing of a light beam directed at one of the photosensors;
after receiving a signal indicating the sensing of a light beam directed at one of the photosensors, cause the at least two light sources to stop;
cause two or more of the at least two light sources to blink respective light beams in succession in order to identify a light source that caused the received signal;
determine orientations of each identified light source that caused a signal at one of the photosensors; and
based on the position of the at least three photosensors and the orientations of each identified light source that cause a signal at one of the photosensors, determine respective transformations from respective local frames of the at least two light sources to the world frame.

14. The system of claim 13, further comprising a pre-measured rigid frame, wherein the at least three photosensors are mounted on the rigid frame; and
wherein the control system is configured to determine the position of the at least three photosensors relative to the world frame based on the position of the photosensors on the rigid frame.

15. The system of claim 13, further comprising a laser tracker; and
wherein the control system is configured to determine the position of the at least three photosensors relative to the world frame by measuring the position of a photosensor using the laser tracker.

16. The system of claim 13, wherein the control system is configured to determine the position of the at least three photosensors relative to the world frame by receiving position data from a position sensor located on one of the photosensors.

17. The system of claim 13, wherein the control system is configured to control the orientation of the at least two light sources by controlling a pan and a tilt of the at least two light sources.

18. The system of claim 13, wherein the control system is further configured to after determining an orientation of a light source that causes a signal at one of the photosensors:
control the light source to cause a light beam to move in at least one direction until the light source reaches a first orientation where the light beam is no longer sensed by the photosensor;
control the light source to cause the light beam to move in an opposite direction of the at least one direction until the light source reaches a second orientation where the light beam is no longer sensed by the photosensor; and
refine the determined orientation based on an average of the first orientation and the second orientation.

19. The system of claim 13, wherein the control system is configured to determine the transformation from a local frame of a light source to the world frame by determining a translation and rotation of the local frame relative to the world frame.

20. The system of claim 13, wherein the control system is further configured to:
cause the at least two light sources to project light beams with different colors simultaneously;
determine a color of a light beam sensed by one of the photosensors; and
use the color of the light beam sensed by the photosensor to determine a respective light source that projected the light beam.

21. The system of claim 13, wherein the control system is further configured to:
cause the at least two light sources to project light beams with different frequencies simultaneously;
determine a frequency of a light beam sensed by one of the photosensors; and
use the frequency of the light beam sensed by the photosensor to determine a respective light source that projected the light beam.

22. The system of claim 13, wherein the control system is further configured to refine the transformation from the local frame of a light source to the world frame by causing a laser tracker to project a laser at a sensor on the light source.

23. The system of claim 13, wherein the control system is further configured to use the transformation from the local frame of a light source to the world frame to determine one or more inaccuracies in commanded positions of the light source.

24. The system of claim 13, wherein the control system is further configured to receive the signals indicating the sensing of a light beam directed at one of the photosensors from a mesh network connecting the photosensors.

25. A non-transitory computer readable medium having stored therein instructions, that when executed by a computing system, cause the computing system to perform functions comprising:
determining a position of at least three photosensors relative to a world frame;
controlling an orientation of at least two light sources so as to cause the at least two light sources to project respective light beams across an area encompassing the at least three photosensors;
receiving, from the at least three photosensors, signals indicating a sensing of a light beam directed at one of the photosensors;

after receiving a signal indicating the sensing of a light beam directed at one of the photosensors, causing the at least two light sources to stop;

causing two or more of the at least two light sources to blink respective light beams in succession in order to identify a light source that caused the received signal;

determining orientations of each identified light source that caused a signal at one of the photosensors; and based on the position of the at least three photosensors and the orientations of each identified light source that caused a signal at one of the photosensors, determining respective transformations from respective local frames of the at least two light sources to the world frame.

* * * * *